(12) United States Patent
Kaneko et al.

(10) Patent No.: US 7,245,744 B2
(45) Date of Patent: *Jul. 17, 2007

(54) METHOD OF DESCRIBING OBJECT REGION DATA, APPARATUS FOR GENERATING OBJECT REGION DATA, VIDEO PROCESSING APPARATUS AND VIDEO PROCESSING METHOD

(75) Inventors: Toshimitsu Kaneko, Yokohama (JP); Osamu Hori, Yokohama (JP); Takeshi Mita, Yokohama (JP); Koji Yamamoto, Yokohama (JP)

(73) Assignee: Kabushiki Kaisha Toshiba, Kawasaki-shi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/939,434

(22) Filed: Sep. 14, 2004

(65) Prior Publication Data

US 2005/0031204 A1   Feb. 10, 2005

Related U.S. Application Data

(60) Continuation of application No. 10/278,948, filed on Oct. 24, 2002, now Pat. No. 6,804,398, which is a division of application No. 09/493,192, filed on Jan. 28, 2000, now Pat. No. 6,940,997.

(30) Foreign Application Priority Data

Jan. 28, 1999 (JP) ................................ 11-020387
Jun. 30, 1999 (JP) ................................ 11-187033

(51) Int. Cl.
    *G06K 9/00* (2006.01)
(52) U.S. Cl. .................... 382/107; 382/100; 382/103; 382/233

(58) Field of Classification Search ................ 382/107, 382/100, 103, 241, 190, 233, 243
    See application file for complete search history.

(56) References Cited

U.S. PATENT DOCUMENTS

| 5,198,896 | A | | 3/1993 | Kondo et al. |
| 5,684,715 | A | * | 11/1997 | Palmer ........................ 348/473 |
| 5,696,844 | A | * | 12/1997 | Takagi ......................... 382/199 |
| 5,708,845 | A | | 1/1998 | Wistendahl et al. |
| 5,751,365 | A | * | 5/1998 | Yokoyama ............... 348/416.1 |
| 5,778,098 | A | | 7/1998 | Lee et al. |
| 5,821,946 | A | | 10/1998 | Nakagawa |

(Continued)

OTHER PUBLICATIONS

Gray-level corner detection, L. Kitchen and A. Rosenfeld, Pattern Recognition Letters, No. 1, pp. 95-102, 1982.

(Continued)

*Primary Examiner*—Matthew C. Bella
*Assistant Examiner*—Shefali Patel
(74) *Attorney, Agent, or Firm*—Oblon, Spivak, McClelland, Maier & Neustadt, P.C.

(57) ABSTRACT

A region data describing method for describing, over a plurality of frames, region data about the region of an arbitrary object in a video, the method specifying the object region in the video with at least either of an approximate figure approximating the region or characteristic points of the region, approximating a trajectory obtained by arranging position data of the representative points or the characteristic point in a direction in which frames proceed with a predetermined function and describing the parameter of the function as region data. Thus, the region of a predetermined object in the video can be described with a small quantity of data. Moreover, creation and handling of data can easily be performed.

11 Claims, 20 Drawing Sheets

U.S. PATENT DOCUMENTS

| | | | |
|---|---|---|---|
| 5,970,504 | A | 10/1999 | Abe et al. |
| 5,982,909 | A | 11/1999 | Erdem et al. |
| 6,252,975 | B1 | 6/2001 | Bozdagi et al. |
| 6,462,754 | B1 | 10/2002 | Chakraborty et al. |
| 6,483,877 | B2 | 11/2002 | Nakaya |
| 6,570,586 | B1 | 5/2003 | Kamen et al. |

OTHER PUBLICATIONS

Improvement in Accuracy of Newspaper Story Based on Telop Character Recognition of News Video:, (Katayama et al. vol. 1, pp. 105-110, proceedings of Meeting on Image (Recognition and Understand (MIRU '98)).

"A video text extraction method for character recognition" [SIC Method of Extracting Character Portion from Video to Recognize Telop], (Hori, 99-CV1M-114, pp. 129-136, 1999, "Information Processing Society of Japan Technical Report").

"Determining Optical Flow", Berthold K.P. Horn and Brian G. Schunck, Artificial Intelligence, vol. 17, pp. 185-203, 1981.

Image Analysis Handbook Chapter-3, Section II, pp. 713-716 Publish conference of Tokyo University, 1991.

Image Analysis Handbook Chapter-2, Section II, pp. 692-693, and pp. 704-705, Publish conference of Tokyo University, 1991.

"Snakes: Active Contour Models", International Journal of Computer vision, vol. 1, No. 4, pp. 321-331, Jul. 1988 disclosed by M. Kass et al.

H. Ozaki, et al., Systems, Man and Cybernetics, 1995. Intelligent Systems for the 21$^{st}$ Century., pp. 4679-4684, XP-010194933, "Control of Mechatronic Systems by Learning Actuator Reference Trajectories Described by B-Spline Curves", Oct. 22, 1995.

D. Zhong, et al., Image Processing, 1997. Proceedings., pp. 21-24, XP-010254098, "Spatio-Temporal Video Search Using the Object Based Video Representation", Oct. 26, 1997.

R. Rosales, et al., citeseer.nj.nec.com/article/rosales99trajectory. html, pp. 1-7, XP-002237447, "3D Trajectory Recovery for Tracking Multiple Objects and Trajectory Guided Recognition of Actions", Apr. 1998.

\* cited by examiner

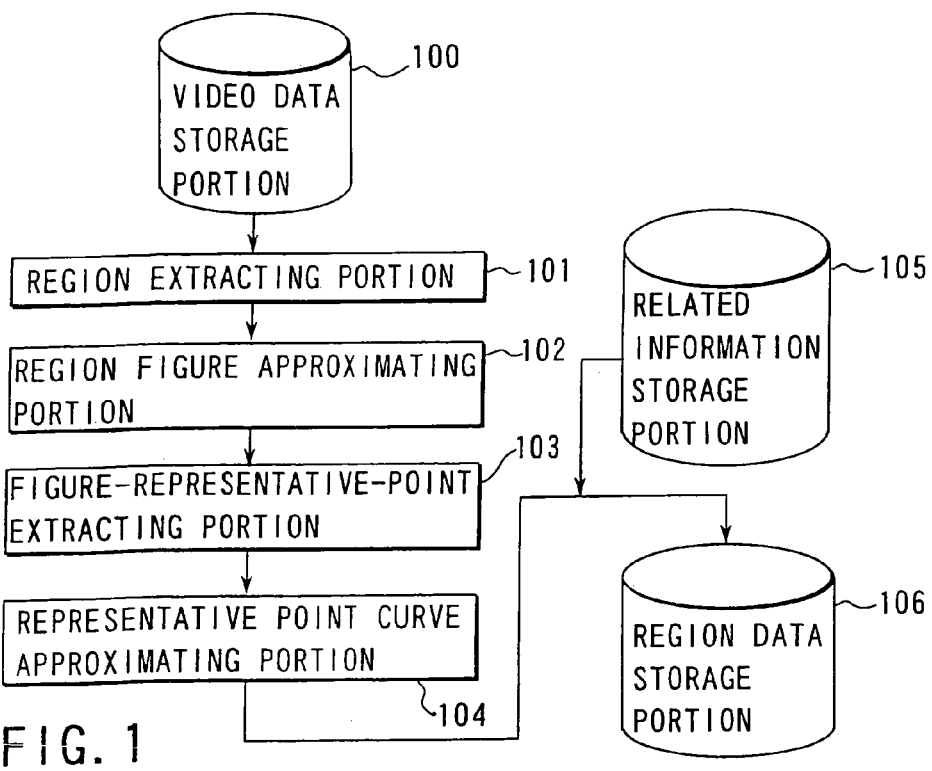
FIG. 1
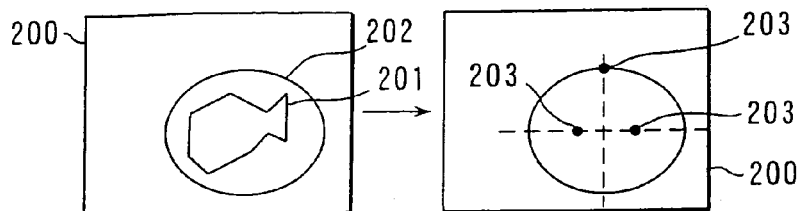
FIG. 2A    FIG. 2B
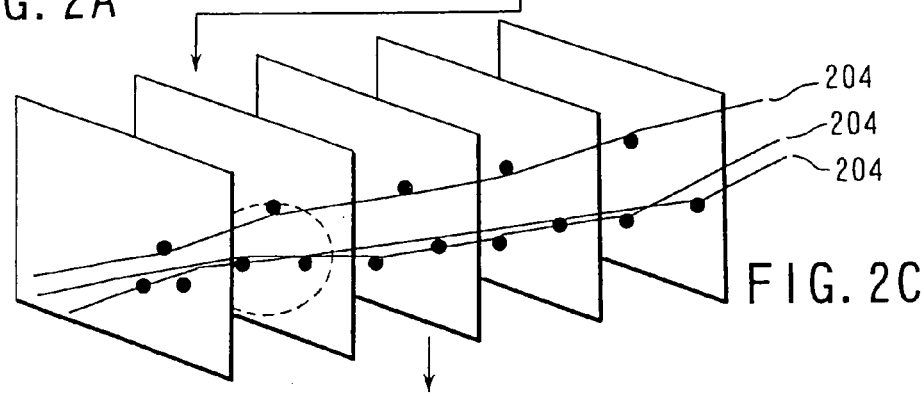
FIG. 2C
$(0 \leq t \leq 5)$
$3t^2 - t + 3$
$(5 \leq t \leq 16)$
$2.4t^3 - 12t^2 + 4t - 28$
FIG. 2D

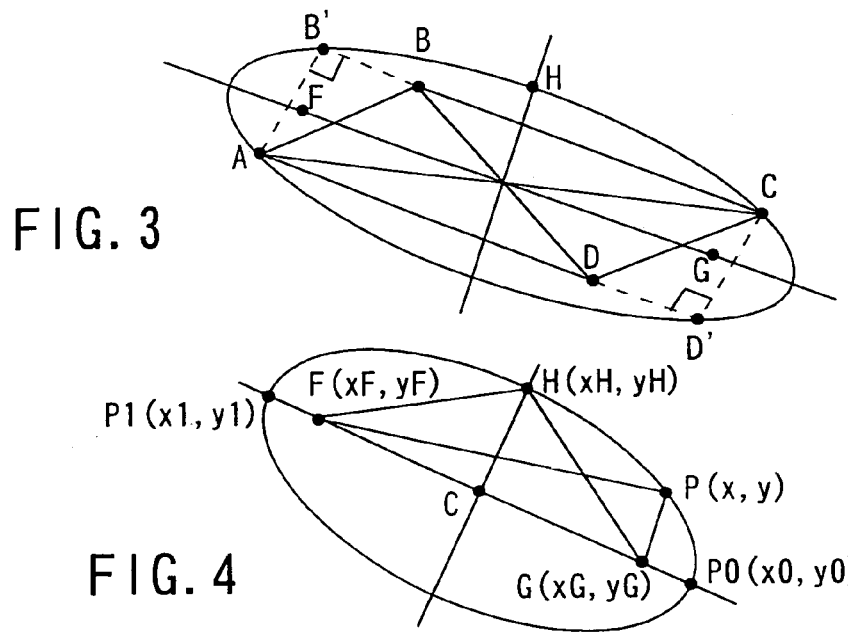

OBJECT REGION DATA

| | |
|---|---|
| ID NUMBER | ~400 |
| LEADING FRAME NUMBER | ~401 |
| TRAILING FRAME NUMBER | ~402 |
| POINTER FOR POINTING RELATED INFORMATION | ~403 |
| APPROXIMATE FIGURE NUMBER | ~404 |
| APPROXIMATE FIGURE DATA | ~405 |

FIG. 6

APPROXIMATE FIGURE DATA

| | |
|---|---|
| FIGURE TYPE ID | ~1300 |
| REPRESENTATIVE POINT NUMBER (M) | ~1301 |
| REPRESENTATIVE POINT LOCUS DATA (1X) | ~1302 |
| REPRESENTATIVE POINT LOCUS DATA (1Y) | ~1303 |
| REPRESENTATIVE POINT LOCUS DATA (2X) | |
| REPRESENTATIVE POINT LOCUS DATA (2Y) | |
| ⋮ | |
| REPRESENTATIVE POINT LOCUS DATA (MX) | |
| REPRESENTATIVE POINT LOCUS DATA (MY) | |

REPRESENTATIVE POINT LOCUS DATA

| | |
|---|---|
| KNOT FRAME NUMBER | ~1400 |
| ORDER OF POLYNOMINAL (K) | ~1401 |
| COEFFICIENT OF POLYNOMINAL (0th-ORDER) | ~1402 |
| COEFFICIENT OF POLYNOMINAL (1th-ORDER) | |
| ⋮ | |
| COEFFICIENT OF POLYNOMINAL (Kth-ORDER) | |
| KNOT FRAME NUMBER | |
| ORDER OF POLYNOMINAL (K') | |
| COEFFICIENT OF POLYNOMINAL (0th-ORDER) | |
| COEFFICIENT OF POLYNOMINAL (1th-ORDER) | |
| ⋮ | |
| COEFFICIENT OF POLYNOMINALS (K'th-ORDER) | |

(1403 brackets the first block)

FIG. 7

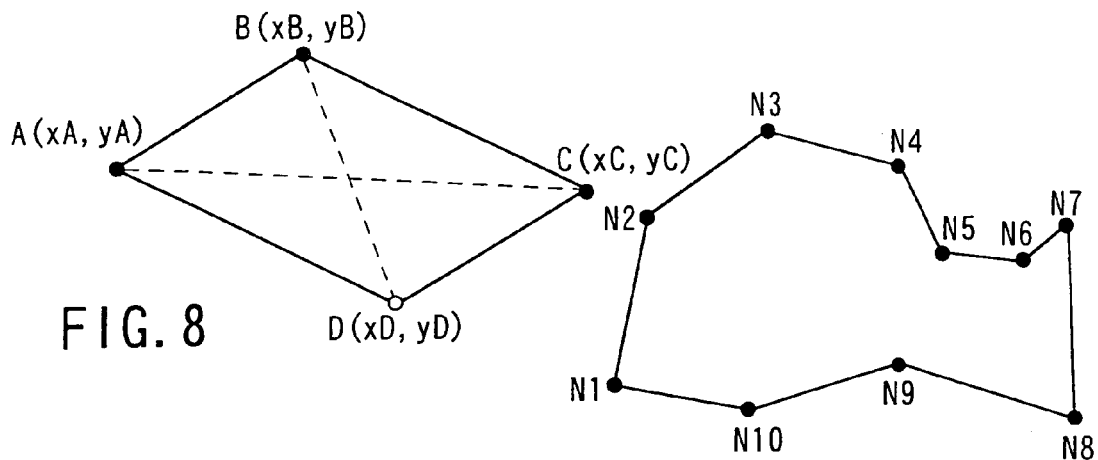

| FIGURE TYPE ID | TYPE OF FIGURE | REPRESENTATIVE POINT NUMBER |
|---|---|---|
| 0 | FORBIDDEN | − |
| 1 | CENTROID | 1 |
| 2 | RECTANGLE | 3 |
| 3 | RECTANGLE & CENTROID | 4 |
| 4 | ELLIPSE | 3 |
| 5 | ELLIPSE & CENTROID | 4 |

FIG. 23

| FUNCTION ID | TYPE OF FUNCTION | FUNCTION PARAMETER | LIMIT CONDITION |
|---|---|---|---|
| −1 | NO TYPE (NUMBER IS NOT DEFINED) | NO PARAMETER | NO LIMIT |
| 0 | $f(t)=f_a+\nu_a(t-t_a)$ | NO PARAMETER | $\nu_a=\dfrac{f_b-f_a}{t_b-t_a}$ |
| 1 | $f(t)=f_a+\nu_a(t-t_a)+\dfrac{1}{2}a_a(t-t_a)^2$ | $a_a$ | $\nu_a=\dfrac{f_b-f_a}{t_b-t_a}-\dfrac{1}{2}a_a(t_b-t_a)$ |

FIG. 24

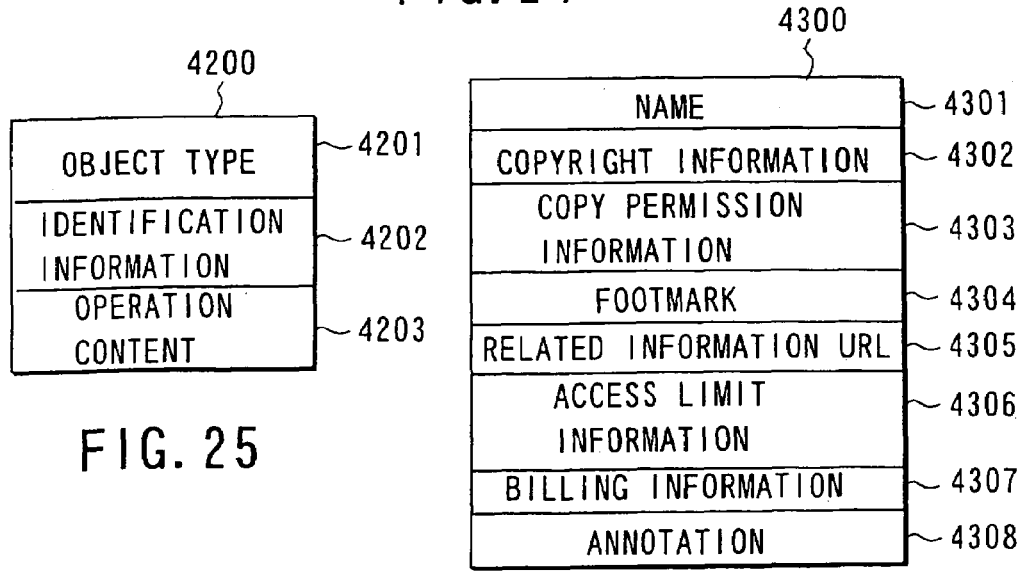

METHOD OF DESCRIBING OBJECT REGION DATA, APPARATUS FOR GENERATING OBJECT REGION DATA, VIDEO PROCESSING APPARATUS AND VIDEO PROCESSING METHOD

CROSS-REFERENCE TO RELATED APPLICATION

The present patent document is a continuation of U.S. application Ser. No. 10/278,948, filed Oct. 24, 2002, now U.S. Pat. No. 6,804,398 which is a divisional of U.S. application Ser. No. 09/493,192, filed Jan. 28, 2000 now U.S. Pat. No. 6,940,997; and in turn claims the benefit of priority from the prior Japanese Patent Application No. 11-187033, filed Jun. 30, 1999, and Japanese Patent Application No. 11-020387. filed Jan. 28, 1999 the entire contents of each of which are hereby incorporated herein by reference.

BACKGROUND OF THE INVENTION

The present invention relates to a method of describing object region data such that information about an object region in a video is described, an apparatus for generating object region data such that information about an object region in a video is generated, a video processing apparatus arranged to be given an instruction about an object in a video to perform a predetermined process or retrieve an object in a video, and a video processing method therefor.

Hyper media are configured such that related information called a hyper link is given in between mediums, such as videos, sounds or texts, to permit mutual reference. When videos are mainly used, related information has been provided for each object which appears in the video. When the object is specified, related information (text information or the like) is displayed. The foregoing structure is a representative example of the hyper media. The object in the video is expressed by a frame number or a time stamp of the video, and information for identifying a region in the video which are recorded in video data or recorded as individual data.

Mask images have frequently been used as means for identifying a region in a video. The mask image is a bit map image constituted by giving different pixel values between the inside portion of an identified region and the outside portion of the same. A simplest method has an arrangement that a pixel value of "1" is given to the inside portion of the region and "0" is given to the outside portion of the same. Alternatively, α values which are employed in computer graphics are sometimes employed. Since the α value is usually able to express 256 levels of gray, a portion of the levels is used. The inside portion of the specified region is expressed as 255, while the outside portion of the same is expressed as 0. The latter image is called an α map. When the regions in the image are expressed by the mask images, determination whether or not a pixel in a frame is included in the specified region can easily be made by reading the value of the pixel of the mask image and by determining whether the value is 0 or 255. The mask image has freedom with which a region can be expressed regardless of the shape of the region and even a discontinuous region can be expressed. The mask image must have pixels, the size of which is the same as the size of the original image. Thus, there arises a problem in that the quantity of data cannot be reduced.

To reduce the quantity of data of the mask image, the mask image is frequently compressed. When the mask image is a binary mask image constituted by 0 and 1, a process of a binary image can be performed. Therefore, the compression method employed in facsimile machines or the like is frequently employed. In the case of MPEG-4 in which ISO/IEC MPEG (Moving Picture Experts Group) has been standardized, an arbitrary shape coding method will be employed in which the mask image constituted by 0 and 1 and the mask image using the α value are compressed. The foregoing compression method is a method using motion compensation and capable of improving compression efficiency. On the other hand, complex compression and decoding processes are required.

To express a region in a video, the mask image or the compressed mask image has usually been employed. However, data for identifying a region is required to permit easy and quick extraction, to be reduced in quantity and to permit easy handling.

On the other hand, the hyper media, which are usually assumed that an operation for displaying related information of a moving object in a video is performed, have somewhat difficulty in specifying the object as distinct from handling of a still image. A user usually has difficulty in specifying a specific portion. Therefore, it can be considered that the user usually aims, for example, a portion in the vicinity of the center of the object in a rough manner. Moreover, a portion adjacent to the object which is deviated from the object is frequently specified according to the movement of the object. Therefore, data for specifying a region is desired to be adaptable to the foregoing media. Moreover, an aiding mechanism for facilitating specification of a moving object in a video is required for the system for displaying related information of the moving object in the video.

As described above, the conventional method of expressing a desired object region in a video by using the mask image suffers from a problem in that the quantity of data cannot be reduced. The method arranged to compress the mask image raises a problem in that coding and decoding become too complicated. What is worse, directly accessing to the pixel of a predetermined frame cannot be performed, causing handling to become difficult.

There arises another problem in that a device for permitting a user to easily instruct a moving object in a video has not been provided.

BRIEF SUMMARY OF THE INVENTION

Accordingly, it is an object of the present invention to provide a method of describing object region data and an apparatus for generating object region data which are capable of describing a desired object region in a video by using a small quantity of data and facilitating generation of data and handling of the same.

Another object of the present invention is to provide a method of describing object region data, an apparatus for generating object region data, a video processing method and a video processing apparatus with which a user is permitted to easily instruct an object in a video and determine the object.

Another object of the present invention is to provide a method of describing object region data, an apparatus for generating object region data, a video processing method and a video processing apparatus with which retrieval of an object in a video can easily be performed.

According to one aspect of the present invention, there is provided a method of describing object region data such that information about an arbitrary object region in a video is described over a plurality of continuous frames, the method identifying a desired object region in a video according to at least either of a figure approximated to the object region or a characteristic point of the object region; approximating a trajectory obtained by arranging positions of representative points of the approximate figure or the characteristic points of the object region in a direction in which frames proceed with a predetermined function; and describing information about the object region by using the parameter of the function.

According to another aspect of the present invention, there is provided a method of describing object region data such that information about an arbitrary object region in a video is described over a plurality of continuous frames, the method describing the object region data by using information capable of identifying at least the frame number of a leading frame and the frame number of a trailing frame of the plurality of the subject frames or the time stamp of the leading frame and the time stamp of the trailing frame, information for identifying the type of the figure of an approximate figure approximating the object region, and the parameter of a function with which a trajectory obtained by arranging position data of representative points of the approximate figure corresponding to the object region in a direction in which frames proceed has been approximated.

According to another aspect of the present invention, there is provided a method of describing object region data such that information about an arbitrary object region in a video is described over a plurality of continuous frames, the method describing the object region data by using information capable of identifying at least the frame number of a leading frame and the frame number of a trailing frame of the plurality of the subject frames or the time stamp of the leading frame and the time stamp of the trailing frame, the number of approximate figures approximating the object region, information for identifying the type of the figure of an approximate figure and the parameters of functions with which trajectories corresponding to the approximate figures and obtained by arranging position data of representative points of each approximate figure in a direction in which frames proceed have been approximated.

According to another aspect of the present invention, there is provided a method of describing object region data such that information about an arbitrary object region in a video is described over a plurality of continuous frames, the method describing the object region data by using information capable of identifying at least the frame number of a leading frame and the frame number of a trailing frame of the plurality of the subject frames or the time stamp of the leading frame and the time stamp of the trailing frame, and the parameter of a function with which a trajectory obtained by arranging position data of characteristic points of the object region in a direction in which frames proceed has been approximated.

Information capable of identifying the frame number of a leading frame and the frame number of a trailing frame of the plurality of the subject frames or the time stamp of the leading frame and the time stamp of the trailing frame is the leading frame number and a trailing frame number or the leading frame number and the difference between the leading frame number and the trailing frame number.

The parameter of the function may be position data of knots of the trajectory and information arranged to be used together with the position data of the knots to be capable of identifying the trajectory. Alternatively, the parameter of the function may be a coefficient of the function.

When a plurality of representative points of the approximate figure of the object region or characteristic points of the object region exist, it is desirable to identify the correspondence between the plural representative points or the characteristic points of the present frame and a plurality of representative points or characteristic points of an adjacent frame.

It is desirable to describe information related to the object or a method of accessing to the related information.

According to another aspect of the present invention, there is provided a recording medium storing object region data containing information about regions of one or more objects described by one of the above methods.

According to another aspect of the present invention, there is provided a recording medium storing object region data containing information about regions of one or more objects described by one of the above methods and information related to each object or information indicating a method of accessing to the related information.

According to another aspect of the present invention, there is provided a recording medium storing object region data containing information about regions of one or more objects described by one of the above methods and information for identifying information related to each object, and information related to each object.

According to another aspect of the present invention, there is provided a video processing method for determining whether or not a predetermined object has been specified in a screen which is displaying a video, the method obtaining information describing parameter of a function approximating a trajectory obtained by arranging position data of representative points of the approximate figure in a direction in which frames proceed when an arbitrary position has been specified in the screen in a case where a region of the predetermined object exists in the video; detecting the position of the representative point in the frame based on the obtained information; detecting the position of the approximate figure in accordance with the detected position of the representative point; determining whether or not the input position exists in the approximate figure; and determining that the predetermined object has been specified when a determination has been made that the input position exists in the approximate figure.

According to another aspect of the present invention, there is provided a video processing method for determining whether or not a predetermined object has been specified in a screen which is displaying a video, the method obtaining information describing parameter of a function approximating a trajectory obtained by arranging position data of characteristic points of the object region in a direction in which frames proceed when an arbitrary position has been specified in the screen in a case where a region of the predetermined object exists in the video; detecting the positions of the characteristic points in the frame in accordance with the obtained information; determining whether or not the distance between the input position and the detected position of the characteristic point is shorter than a reference value; and determining that the predetermined object has been specified when a determination has been made that the distance is shorter than the reference value.

When a determination has been made that the predetermined object has been specified, it is desirable to show information related to the predetermined object.

According to another aspect of the present invention, there is provided a video processing method of displaying a region in which a predetermined object exists when the predetermined object has been specified in a screen which is displaying a video, the video processing method obtaining information describing parameter of a function approximating a trajectory obtained by arranging position data of at least representative points of an approximate figure of the object region or characteristic points of the object region in a direction in which frames proceed when the region of the predetermined object exists in the video; detecting the representative point or the characteristic point in the frame in accordance with the obtained information; and displaying information for displaying the position of the object region in the screen in a predetermined form of display in accordance with the detected representative point or the characteristic point.

According to another aspect of the present invention, there is provided a video processing method for retrieving a predetermined object among objects which appears in a video and which satisfies a predetermined condition, the video processing method inputting an arbitrary position in the video and a retrieving condition determined in accordance with the input position; obtaining information describing parameter of a function approximating a trajectory obtained by arranging position data of representative points of an approximate figure of an object region produced for each object which appears in the video or a characteristic point of the object region in a direction in which frames proceed; determining, for each object over a plurality of frames, whether or not the representative point of the approximate figure or the characteristic point and the input position have a predetermined relationship in one frame of one object obtained in accordance with the obtained information; and detecting the predetermined object satisfying the retrieving condition in accordance with a result of determination.

The predetermined relationship may be the relationship that the input position exists in the approximate figure region or the relationship that the distance from the characteristic point to the input position is shorter than a reference value. The retrieving condition may be a condition of an object which is to be extracted, which is selected from a retrieval condition group consisting of a condition that at least one frame satisfying the predetermined relationship exists at the input position, a condition that the predetermined number of frames each satisfying the predetermined relationship exists successively with regard to the input position and a condition that the predetermined relationship is not satisfied in all of the frames.

The retrieval condition group includes, as a condition which must be added to the condition which is determined in accordance with the position, an attribute condition which must be satisfied by the approximate figure of the object.

According to another aspect of the present invention, there is provided a video processing method for retrieving a predetermined object among objects which appears in a video and which satisfies a predetermined condition, the video processing method inputting information for specifying a trajectory of the position in a video which is to be retrieved; obtaining information describing parameter of a function approximating a trajectory obtained by arranging position data of representative points of an approximate figure of the object region produced for each object which appears in a video and which is to be retrieved or a characteristic point of the object region in a direction in which frames proceed; evaluating, for each object, similarity of the trajectory of the representative point or the characteristic point of the one object detected in accordance with the obtained information and the trajectory of the input position; and detecting the predetermined object corresponding to the specified trajectory.

Information for specifying the trajectory of the position may be time sequence information including the relationship between the position and time. The similarity may be evaluated while the positional relationship is being added.

The specified trajectory may be a trajectory of an object in a video which has been specified. Alternatively, a user may be permitted to input the trajectory by drawing the trajectory on a GUI.

According to another aspect of the present invention, there is provided an object-region-data generating apparatus for generating data about described information of a region of an arbitrary object in a video over a plurality of continuous frames, the object-region-data generating apparatus comprising a circuit configured to approximate an object region in the video in a plurality of the subject frames by using a predetermined figure; a detector configured to detect, in the plural frames, coordinate values of the predetermined number of representative points identifying the predetermined figure which has been used in the approximation; and a circuit configured to approximate a trajectory of a time sequence of the coordinate values of the representative points obtained over the plurality of the continuous frames with a predetermined function, so that information about the object region is generated by using the parameter of the function.

According to another aspect of the present invention, there is provided an object-region-data generating apparatus for generating data about described information of a region of an arbitrary object in a video over a plurality of continuous frames, the object-region-data generating apparatus comprising a detector configured to detect the coordinate values of the predetermined number of characteristic points of an object region in a video over the plurality of the subject frames, and a circuit configured to approximate a time sequential trajectory of the coordinate values of the characteristic points obtained over the plurality of the continuous frames with a predetermined function, wherein the parameter of the function is used to generate information about the object region.

According to another aspect of the present invention, there is provided a video processing apparatus for performing a predetermined process when a predetermined object has been specified in a screen which is displaying a video, the video processing apparatus comprising a circuit configured to obtain a parameter of a function approximating a trajectory obtained by arranging position data of representative points of an approximate figure of the object region in a direction in which frames proceed in a case where a region of a predetermined object exists in the video when an arbitrary position has been specified in the screen to detect the position of the representative point in the frame; a detector configured to detect the position of the approximate figure in accordance with the detected position of the representative point; and a circuit configured to determine whether or not the input position exists in the approximate figure.

According to another aspect of the present invention, there is provided a video processing apparatus for performing a predetermined process when a predetermined object has been specified in a screen which is displaying a video, the video processing apparatus comprising a circuit configured to obtain a parameter of a function approximating a trajectory obtained by arranging position data of a characteristic point of the object region in a direction in which frames proceed in a case where the region of the predetermined object exists in the video when arbitrary position has been specified in the screen to detect the position of the characteristic point in the frame; and a circuit configured to determine whether or not the distance between the input position and the detected position of the characteristic point is shorter than a reference value.

According to another aspect of the present invention, there is provided a video processing apparatus for performing a predetermined process when a predetermined object has been is specified in a screen which is displaying a video, the video processing apparatus comprising a circuit configured to obtain a parameter of a function approximating a trajectory obtained by arranging position data of at least a representative point of an approximate figure of the object region or a characteristic point of the object region in a direction in which frames proceed when the region of the predetermined object exists in the video to detect the representative point or the characteristic point in the frame; and a circuit configured to display information for indicating the position of the object region in the screen in a predetermined display form.

According to another aspect of the present invention, there is provided a video processing apparatus for retrieving a predetermined object among objects which appears in a video and which satisfies an specified condition, the video processing apparatus comprising a circuit configured to obtain information describing parameter of a function approximating a trajectory obtained by arranging position data of representative points of an approximate figure of the object region produced for each object which appears in a video which is to be retrieved or a characteristic point of the object region in a direction in which frames proceed when an arbitrary position in the video which is to be retrieved and a retrieving condition determined in accordance with the position have been input; a circuit configured to determine, for each object over a plurality of the frames, whether or not the approximate figure or the characteristic point of one object in one frame obtained in accordance with the obtained information and the input position satisfy a predetermined relationship; and a detector configured to detect an object which satisfies the retrieving condition in accordance with a result of the determination.

According to another aspect of the present invention, there is provided a video processing apparatus for retrieving a predetermined object among objects which appears in a video and which satisfies an specified condition, the video processing apparatus comprising a circuit configured to obtain information describing parameter of a function approximating a trajectory obtained by arranging position data of representative points of an approximate figure of the object region produced for each object which appears in the video which is to be retrieved or a characteristic point of the object region in a direction in which frames proceed when information for specifying a trajectory of the position in a video which is to be retrieved has been input; a circuit configured to evaluate, for each object, similarity between the trajectory of the representative point or the characteristic point of one object obtained in accordance with the obtained information and the trajectory of the input position; and a detector configured to detect the predetermined object corresponding to the specified trajectory in accordance with the evaluated similarity.

Note that the present invention relating to the apparatus may be employed as the method and the present invention relating to the method may be employed as the apparatus.

The present invention relating to the apparatus and the method may be employed as a recording medium which stores a program for causing a computer to perform the procedure according to the present invention (or causing the computer to serve as means corresponding to the present invention or causing the computer to realize the function corresponding to the present invention) and which can be read by the computer.

The present invention is configured such that the object region in a video over a plurality of frames is described as a parameter of a function approximating a trajectory obtained by arranging position data of representative points of an approximate figure of the object region or a characteristic point of the object region in a direction in which frames proceed. Therefore, the object region in the video over the plural frames can be described with a small quantity of the function parameters. Hence it follows that the quantity of data required to identify the object region can effectively be reduced. Moreover, handling can be facilitated. Moreover, extraction of a representative point or a characteristic point from the approximate figure or generation of the parameter of the approximate curve can easily be performed. Moreover, generation of an approximate figure from the parameter of the approximate curve can easily be performed.

When the representative point of the approximate figure is employed, a fundamental figure, for example, one or more ellipses, are employed such that each ellipse is represented by two focal points and another point. Thus, whether or not arbitrary coordinates specified by a user exist in the object region (the approximate figure) can be determined by using a simple discriminant. Hence it follows that the user is able to easily instruct a moving object in a video.

When the characteristic point is employed, whether or not the arbitrary coordinates specified by a user indicates the object region can considerably easily be determined. Thus, a moving object in a video can easily be specified by the user.

When display of an object region among regions of objects which can be identified by using object region data and which has related information, or display of an image indicating the object region is controlled, the user is permitted to quickly recognize whether or not related information exists and the position of the object region. Therefore, the operation which is performed by the user can effectively be aided.

According to the present invention, retrieval of an object in a video can easily be performed in accordance with a position in a video through which the object passes, residence time at a certain point or a trajectory.

Additional objects and advantages of the present invention will be set forth in the description which follows, and in part will be obvious from the description, or may be learned by practice of the present invention.

The objects and advantages of the present invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the present invention and, together with the general description given above and the detailed description of the preferred embodiments given below, serve to explain the principles of the present invention in which:

FIG. 1 is a diagram showing an example of the structure of an object-region-data generating apparatus according to a first embodiment of the present invention;

FIGS. 2A, 2B, 2C and 2D are diagrams showing a procedure for describing an object region in a video with object region data;

FIG. 3 is a diagram showing an example of a process for approximating an object region with an ellipse;

FIG. 4 is a diagram showing an example of a process for detecting a representative point of an approximate ellipse of an object region;

FIG. 5 is a diagram showing an example of the structure of object region data;

FIG. 6 is a diagram showing an example of the structure of data of an approximate figure in object region data;

FIG. 7 is a diagram showing an example of the structure of data of a trajectory of a representative point in data of an approximate figure;

FIG. 8 is a diagram showing an example of representative points when the approximate figure is a parallelogram;

FIG. 9 is a diagram showing an example of representative points when the approximate figure is a polygon;

FIG. 23 is a diagram showing an example of the correspondence among the ID of types of figures, the type of the figures and the number of representative points;

FIG. 24 is a diagram showing an example of the correspondence among the ID of a function, the form of the function and the function parameter and the limit condition;

FIG. 25 is a diagram showing a specific example of the structure of data about related information;

FIG. 26 is a diagram showing another specific example of the structure of data about related information;

DETAILED DESCRIPTION OF THE INVENTION

Figure 10:
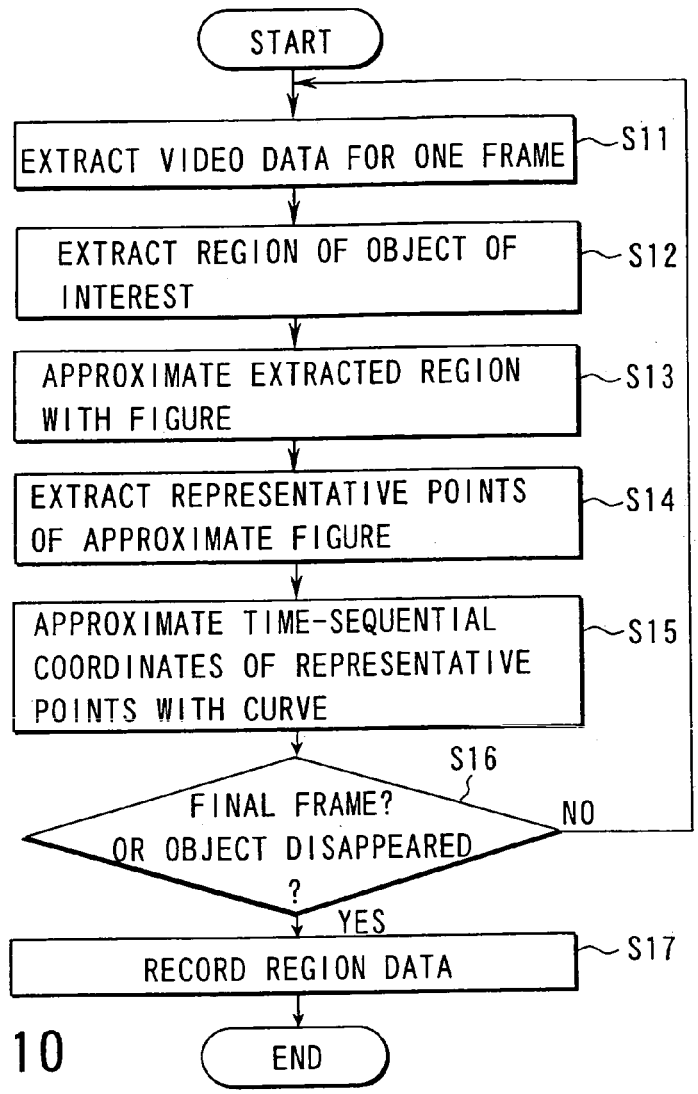
FIG. 10 is a flowchart showing an example of a procedure according to the first embodiment of the present invention.

A preferred embodiment of an object-region-data generating apparatus according to the present invention will now be described with reference to the accompanying drawings.

FIRST EMBODIMENT

FIG. 1 is a block diagram showing the structure of a first embodiment of the present invention. As shown in FIG. 1, an object-region-data generating apparatus incorporates a video data storage portion 100, a region extracting portion 101, a region figure approximating portion 102 for approximating a region with a figure, a figure-representative-point extracting portion 103, a representative point trajectory curve approximating portion 104 for approximating representative points with a curve, a related information storage portion 105 and a region data storage portion 106. A case will now be described in which the process according to this embodiment (in particular, processes arranged to be performed by the region extracting portion 101 or the region figure approximating portion 102) is configured such that the operation which is performed by a user is permitted. In the foregoing case, the GUI (not shown in FIG. 1) is employed with which video data is displayed in, for example, frame units to permit input of an instruction from the user.

The video data storage portion 100 stores video data and comprises, for example, a hard disk, an optical disk or a semiconductor memory.

The region extracting portion 101 extracts a portion of regions of video data. The portion of the regions are regions of an object, such as a specific person, a vehicle or a building (as an alternative to this, a portion of the object, for example, the head of a person, the bonnet of a vehicle or the front door of a building) in the video. Usually a video has the same object in the continuous frames thereof. The region corresponding to the same object frequently changes owing to the movement of the object or shaking of a camera during an image pick-up operation.

The region extracting portion 101 extracts an object region in each frame corresponding to the movement or deformation of the object of interest. Specifically, the extraction is performed by a method of manually specifying a region in each of all of the frames. Another method may be employed with which the contour of an object is continuously extracted by using an active contour model called "Snakes" as disclosed in "Snakes: Active contour models" (International Journal of Computer Vision, vol. 1, No. 4, pp. 321-331, July, 1988 disclosed by M. Kass et al.). Also a method disclosed in "Method of tracing high-speed mobile object for producing hyper media contents by using robust estimation" (CVIM 113-1, 1998, technical report of Information Processing Society of Japan) may be employed. According to the disclosure, deformation and movement of the overall body of an object are estimated in accordance with a position to which a partial object region has been moved and which has been detected by performing block matching. Alternatively, a method of identifying a region having similar colors by performing growing and division of a region as disclosed in Image Analysis Handbook (Chapter-2, Section II, Publish Conference of Tokyo University, 1991) may be employed.

The region figure approximating portion 102 approximates an object region in a video extracted by the region extracting portion 101 with a predetermined figure. The figure may be an arbitrary figure, such as a rectangle, a circle, an ellipse or a polygon. Also a method of approximating a region may be a method of performing approximation to a figure circumscribing the region. Another method of performing approximation to a figure inscribing the region may be employed or a method may be employed which is arranged such that the centroid of the region is employed as the centroid of the approximate figure. Another method of making the area ratio of the region and the approximate figure to be the same may be employed. As an alternative to the approximation of the object region with a predetermined type figure, the type of the figure may be specified by a user for each object to which approximation is performed. Another method may be employed with which the type of the figure is automatically selected in accordance with the shape of the object or the like for each of the object to which approximation is performed.

The approximation of the region with the figure is performed for each frame whenever a result of extraction performed by the region extracting portion 101 is input. Alternatively, approximation with a figure may be performed by using a result of extraction of a plurality of preceding and following frames. When the result of extraction of the plural frame is employed, change in the size and position of the approximate figure is smoothed among the plural frames so that the movement and deformation of the approximate figure are smoothed or an error in the extraction of the region is made to be inconspicuous. Note that the size of the approximate figure may vary among the frames.

The figure-representative-point extracting portion 103 extracts representative points of the approximate figure which is an output of the region figure approximating portion 102. The point which is employed as the representative point varies according to the type of the employed approximate figure. When the approximate figure is formed into, for example, rectangle, the four or three vertices of the rectangle may be the representative points. When the approximate, figure is formed into a circle, the representative points may be the center and one point on the circumference or two end points of the diameter. When the approximate figure is an ellipse, the representative points may be the vertex of a circumscribed rectangle of the ellipse or the two focal points and,one point on the ellipse (for example, one point on the minor axis). When an arbitrary closed polygon is the approximate figure, the vertices may be the representative points of the figure.

The representative points are extracted in frame units whenever information about the approximate figure for one frame is output from the region figure approximating portion 102. Each representative point is expressed by the coordinate axis in the horizontal (X) direction and the coordinate axis in the vertical (Y) direction.

The representative point trajectory curve approximating portion 104 time-sequentially approximates the sequence of the representative points extracted by the figure-representative-point extracting portion 103 to a curve. The approximate curve is, for each of the X coordinate and Y coordinate of each representative point, expressed as a function of the frame number f or time stamp t given to the video. The approximation with the curve may be approximation with a straight line or approximation with a spline curve.

The related information storage portion 105 stores information (as an alternative to this, information about the address at which related information stored in another storage apparatus, for example, Internet or a server on a LAN) relating to the object which appears in video data stored in the video data storage portion 100. Related information may be a character, voice, a still image, a moving image or their combination. Alternatively, related information may be data describing the operation of a program or a computer. Similarly to the video data storage portion 100, the related information storage portion 105 comprises a hard disk, an optical disk or a semiconductor memory.

The region data storage portion 106 is a storage medium in which object region data is stored which includes data for expressing a formula of the curve approximating the time-sequential trajectory of the representative points which is the output of the representative point trajectory curve approximating portion 104. When related information about the object corresponding to the region expressed by a function has been stored in the related information storage portion 105, object region data may include related information and the address at which related information has been recorded. When information of the address of recorded related information has been stored in the related information storage portion 105, also address information may be recorded. Similarly to the video data storage portion 100 and the related information storage portion 105, the region data storage portion 106 comprises a hard disk, an optical disk or a semiconductor memory.

The video data storage portion 100, the related information storage portion 105 and the region data storage portion 106 may be constituted by individual pieces of storage apparatus. Alternatively, the overall portion or a portion may be constituted by one storage apparatus.

The object-region-data generating apparatus may be realized by a software which is operated on a computer.

The operation of the object-region-data generating apparatus will specifically be described.

FIGS. 2A, 2B, 2C and 2D are diagrams more specifically showing a sequential process. The sequential process includes a process which is performed by the region extracting portion 101 to extract the object region. Moreover, a process which is performed by the region figure approximating portion 102 to approximate the region and a process which is performed by the figure-representative-point extracting portion 103 to extract a representative point of a figure are included. Also a process which is performed by the representative point trajectory curve approximating portion 104 to approximate the representative point trajectory with a curve is included.

In this case, the region figure approximating portion 102 employs a method of approximating the region with an ellipse. The figure-representative-point extracting portion 103 employs a method of extracting the two focal points of the ellipse and one point on the ellipse. The representative point trajectory curve approximating portion 104 employs a method of approximating the sequence of the representative points with a spline function.

Referring to FIG. 2A, reference numeral 200 represents a video of one frame which is to be processed. Reference numeral 201 represents the object region which is to be extracted. A process for extracting the object region 201 is performed by the region extracting portion 101. Reference numeral 202 represents an ellipse which is a result of approximation of the object region 201 with an ellipse. A process for obtaining the ellipse 202 from the object region 201 is performed by the region figure approximating portion 102.

FIG. 3 shows an example of the method of obtaining an approximate ellipse when the object region is expressed by a parallelogram. Points A, B, C and D shown in FIG. 3 are vertices of the parallelogram which is the object region. In the foregoing case, calculations are performed so that which side AB or side BC is a longer side is determined. Then, a smallest rectangle having portions of its sides which are the longer side and its opposite side is determined. In the case shown in FIG. 3, a rectangle having four points A, B', C and D' is the smallest rectangle. The approximate ellipse is a circumscribing ellipse similar to the ellipse inscribing the rectangle and passing the points A, B', C and D'.

Referring to FIG. 2B, reference numerals 203 represent representative points of a figure expressing an ellipse. Specifically, the representative points are two focal points of the ellipse and one point on the same (one point on the minor axis in the case shown in FIG. 2B). The focal points of the ellipse can easily be determined from points on the two axes or a circumscribing rectangle of the ellipse. An example will now be described with which focal points F and C are determined from two points $P_0$ and $P_1$ on the major axis and point H on the minor axis shown FIG. 4.

Initially, a and b which are parameters of the major axis and the minor axis, center C of the ellipse and eccentricity e are determined as follows:

$E(P_0, P_1) = 2 \times a$ $C = (P_0 + P_1)/2$ $E(C, H) = b$ $e = (1/a) \times \sqrt{(a \times a - b \times b)}$ where E (P, Q) is the Euclidean distance between the point P and the point Q. In accordance with the determined parameters, the focal points F and G can be determined as follows:

$F = C + e \times (P_0 - C)$ $G = C - e \times (P_0 - C)$

Thus, the representative points F, G and H of the ellipse are determined. When the foregoing points are made to correspond to the representative points of the ellipse extracted in another frame, ambiguity is involved. That is, two combinations exist which make the two extracted focal points correspond to the two focal points in the previous frame Since two intersections exist between the minor axis and the ellipse, the intersection corresponding to the one point on the ellipse extracted in the previous frame cannot be determined. A method of determining the combination and the intersection will now be described.

An assumption is made that the two focal points extracted in the previous frame are Fp and Gp. To determine F or G which correspond to Fp, the following comparison is made:

$E((Gp-Fp)/2, (G-F)/2)$ and $E((Gp-Fp)/2, (F-G)/2)$

When the former focal point is smaller, Fp is made to correspond to F, and Gp is made to correspond to G. When the latter focal point is smaller, Fp is made to correspond to G and, Gp is made to correspond to F.

An assumption is made that the intersections between the minor axis and the ellipse in the previous frame are Hp and the intersections between the minor axis of the ellipse in the present frame are H and H'. The point H or H' which must be made to correspond to Hp is determined by calculating two distances:

$E(Hp-(Gp+Fp)/2, H-(F+G)/2)$ and $E(Hp-(Gp+Fp)/2, H'-(F+G)/2)$

When the former distance is shorter, H is selected. In a negative case, H' is selected. Note that the intersection H between the minor axis and the ellipse in the first frame may be either of the two intersections.

The foregoing process for extracting the representative points from the ellipse is performed by the figure-representative-point extracting portion 103.

The representative points extracted by the foregoing process are usually varied in the position among the successive frames owing to movement of the object of interest in the video or shaking of the image pick-up camera. Therefore, the corresponding representative points of the ellipses are time-sequentially arranged to perform approximation with a spline function for each of the X and Y axes. In this embodiment, each of the three points F, G and H (see FIG. 4) which are the representative points of the ellipse requires a spline function for the X and Y coordinates. Therefore, six spline functions are produced.

The approximation to a curve with spline functions is performed by the representative point trajectory curve approximating portion 104.

The process which is performed by the representative point trajectory curve approximating portion 104 may be carried out whenever the coordinates of the representative points of each frame relating to the object region are obtained. For example, the approximation is performed whenever the coordinates of the representative ports in each frame are obtained. Moreover, an approximation error is obtained to arbitrarily divide the approximation region in such a manner that the approximation error satisfies a predetermined range. Another method may be employed with which the process is performed after the coordinates of the representative points in all of the frames relating to the object region have been obtained.

Reference numeral 204 shown in FIG. 2C represents the approximated spline function expressed three-dimensionally. Reference numeral 205 shown in FIG. 2D represents an example of the spline function which is the output of the representative point trajectory curve approximating portion 104 (only one axis of coordinate of one representative point is shown). In this example, the approximation region is divided into two sections (the number of knots is three) which are t=0 to 5 and t=5 to 16.

The thus-obtained spline functions are recorded in the region data storage portion 106 in a predetermined data format.

As described above, this embodiment enables the object region in a video to be described as the parameter of a curve approximating a time-sequential trajectory (a trajectory of the coordinates of the representative points having the variable are the frame numbers or the time stamps) of the representative points of the approximate figure of the region.

According to this embodiment, the object region in a video can be expressed by only the parameters of the function. Therefore, object region data, the quantity of which is small and which can easily be handled, can be produced. Also extraction of representative points from the approximate figure and producing of parameters of the approximate curve can easily be performed. Moreover, producing of an approximate figure from the parameters of the approximate curve can easily be performed.

A method may be employed with which a basic figure, for example, one or more ellipses are employed as the approximate figures and each ellipse is represented by two focal points and another point. In the foregoing case, whether or not arbitrary coordinates specified by a user exist in the region (the approximate figure) of the object (whether or not the object region has been specified) can be determined by a simple determinant. Thus, specification of a moving object in a video can furthermore easily be performed by the user.

The data format of object region data which is stored in the region data storage portion 106 will now be described. A case will now be described in which the representative points are approximated with a spline function. As a matter of course, a case in which the representative points are approximated with another function is performed similarly.

FIG. 5 shows an example of the data format of object region data for recording the spline function indicating the object region in a video and information related to the object.

ID number 400 is an identification number which is given to each object. Note that the foregoing data item may be omitted.

A leading frame number 401 and a trailing frame number 402 are leading and trailing frame numbers for defining existence of the object having the foregoing ID number. Specifically, the numbers 401 and 402 are the frame number at which the object appears in the video and the frame number at which the object disappears. The frame numbers are not required to be the frame numbers at which the object actually appears and disappears in the video. For example, an arbitrary frame number after the appearance of the object in the video may be the leading frame number. An arbitrary frame number which follows the leading frame number and which precedes the frame of disappearance of the object in the video may be the trailing frame number. The leading/trailing time stamp may be substituted for the lading/trailing frame number. The object existence frame number or object existence time may be substituted for the trailing frame number 402.

A pointer (hereinafter called a "related information pointer") 403 for pointing related information is the address or the like of the data region in which data of information related to the object having the foregoing ID number. When the related information pointer 403 for pointing related information is used, retrieval and display of information related to the object can easily be performed. The related information pointer 403 for pointing related information may be pointer for pointing data of description of a program or the operation of a computer. In the foregoing case, when the object has been specified by a user, the computer performs a predetermined operation.

Note that the related information pointer 403 for pointing related information may be omitted when the objects are not required to perform individual operations.

The operation for describing the related information pointer 403 for pointing related information in the object region data will now be described. As an alternative to using the pointer 403, related information itself may be described in object region data. The related information pointer 403 for pointing related information and related information may be described in object region data. In the foregoing case, a flag is required to indicate whether the related information pointer for pointing related information or related information has been described in object region data.

The approximate figure number 404 is the number of the figures approximating the object region. In the example shown in FIG. 2A in which the object region is approximated with one ellipse, the number of the figures is 1.

Approximate figure data 405 is data (for example, the parameter of a spline function) of a trajectory of the representative point of the figure for expressing an approximate figure.

Note that approximate figure data 405 exists by the number corresponding to the approximate figure number 404 (a case where the approximate figure number 404 is two or larger will be described later).

The number of the approximate figure number 404 for object region data may always be one (therefore, also approximate figure data 405 is always one) to omit the field for the approximate figure number 404.

FIG. 6 shows the structure of approximate figure data 405 (see FIG. 5).

A figure type ID 1300 is identification data for indicating the type of a figure serving as the approximate figure, the figure type ID 1300 being arranged to identify a circle, an ellipse, a rectangle and a polygon.

A representative point number 1301 indicates the number of representative points of the figure specified by the figure type ID 1300. Note that the number of the representative points is expressed with M.

A pair of representative point trajectory data items 1302 and 1303 are data regions relating to the spline function for expressing the trajectory of the representative points of the figure. The representative points of one figure require data of one pair of spline functions for the X and Y coordinates. Therefore, data of the trajectory of the representative points for specifying the spline function exists by representative point number (M)×2.

Note that the type of the employed approximate figure may previously be limited to one type, for example, an ellipse. In the foregoing case, the field for the figure type ID 1300 shown in FIG. 6 may be omitted.

When the representative point number is defined according to the figure type ID 1300, the representative point number may be omitted.

FIG. 7 shows an example of the structure of representative point trajectory data 1302 and 1303.

A knot frame number 1400 indicates the knots of the spline function. Thus, a fact that polynomial data 1403 is effective to the knots is indicated. The number of coefficient data 1402 of the polynomial varies according to the highest order of the spline function (assuming that the highest order is K, the number of coefficient data is K+1). Therefore, reference to a polynomial order 1401 is made. Subsequent to the polynomial order 1401, polynomial coefficients 1402 by the number corresponding to the polynomial order (K)+1 follows.

Since the spline function is expressed in an individual polynomial among the knots, the polynomials are required by the number corresponding to the number of knots. Therefore, data 1403 including the knot frame number and the coefficient of the polynomial is described repeatedly. When the knot frame number is the same as the trailing end frame, it means the trailing end polynomial coefficient data. Therefore, termination of representative point trajectory data can be understood.

A case will now be described in which a figure except for the ellipse is employed as the approximate figure.

FIG. 8 is diagram showing the representative points in a case where a parallelogram is employed as the approximate figure. Points, A, B, C and D are vertices of the parallelogram. Since three points of the four vertices are determined, the residual one is determined. Therefore, three vertices among the four vertices are required to serve as the representative points. In the foregoing example, three points, which are A, B and C, are employed as the representative points.

FIG. 9 is a diagram showing representative points in a case where a polygon is employed to serve as the approximate figure. In the case of the polygon, the order of the vertices is made to be the order along the outer surface. Since the example shown in FIG. 9 has 10 vertices, all of the vertices $N_1$ to $N_{10}$ are employed as the representative points. In the foregoing case, the number of the vertices may be reduced by employing only vertices each having an internal angle smaller than 180° as the representative points.

As described above, the foregoing process may be performed by software which is operated on a computer. FIG. 10 is a flowchart showing the process which is performed by the video processing apparatus according to this embodiment. When the video processing apparatus according to this embodiment is realized by software, a program according to the flowchart shown in FIG. 10 is produced.

In step S11, video data for one frame is extracted from the video data storage portion 100.

In step S12, the region of a predetermined object in the video is extracted. Extraction may be performed by a method similar to that employed by the region extracting portion 101.

In step S13, an approximate figure is approximated to region data which is a result of the process performed in step S12. The approximation method may be similar to that employed by the region figure approximating portion 102.

In step S14, the representative points of the figure approximated in step S13 is extracted. Also a method similar to that employed by the figure-representative-point extracting portion 103 may be employed.

In step S15, approximation of the position of a representative point train of the approximate figure in the successive frame with a curve is performed. Also a method similar to that employed by the representative point trajectory curve approximating portion 104 may be employed.

In step S16, a branching process is performed. Thus, determination is made whether or not the processed image is in the final frame or whether or not the object in the processed frequency which is to be extracted has disappeared from the image (or considered that the object has disappeared). In an affirmative case, the process is branched to step S17. In a negative case (both of the cases are negated), the process is branched to step S11.

In step S17, the approximate curve calculated in step S15 is recorded in a recording medium as object region data in accordance with a predetermined format.

Figure 11:
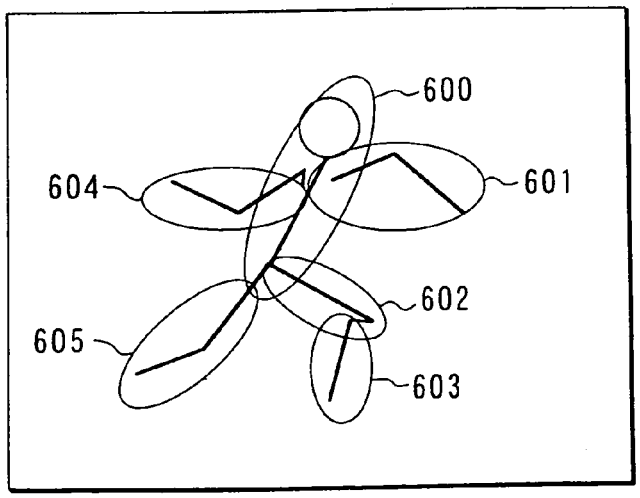
FIG. 11 is a diagram showing an example in which the object region in a video is expressed with a plurality of ellipses.

The example has been described with which one figure is assigned to one object to roughly express the object region. The accuracy of approximation may be improved by making approximation to the region of one object with a plurality of figures. FIG. 11 shows an example in which a plurality of figures are approximated to one object. In the foregoing case, a region of a person in the image is expressed with 6 ellipses 600 to 605.

When one object is expressed with the plural figures as shown in FIG. 11, a process for dividing the object into a plurality of regions must be performed. The process may be performed by an arbitrary method. For example, a method with which the object is directly divided with manpower may be employed. In the foregoing case, a pointing device, such as a mouse, is used to, on the image, enclose the region with a rectangle or an ellipse. Alternatively, the region is specified with a trajectory of the pointing device. When an automatic method is employed as a substitute for the manpower, a method may be employed with which clustering of movement of the object is performed to realize the division. The foregoing method is a method with which the movement of each region in the object among the successive frames is determined by a correlation method (refer to, for example, Image Analysis Handbook Chapter-3, Section II, Publish Conference of Tokyo University, 1991) or a method with gradient constraints (refer to, for example, Determining optical flow, B. K. P. Horn and B. G. Schunck, Artificial Intelligence, Vol. 17, pp. 185-203, 1981) to collect similar movements to form a region.

Figure 12:
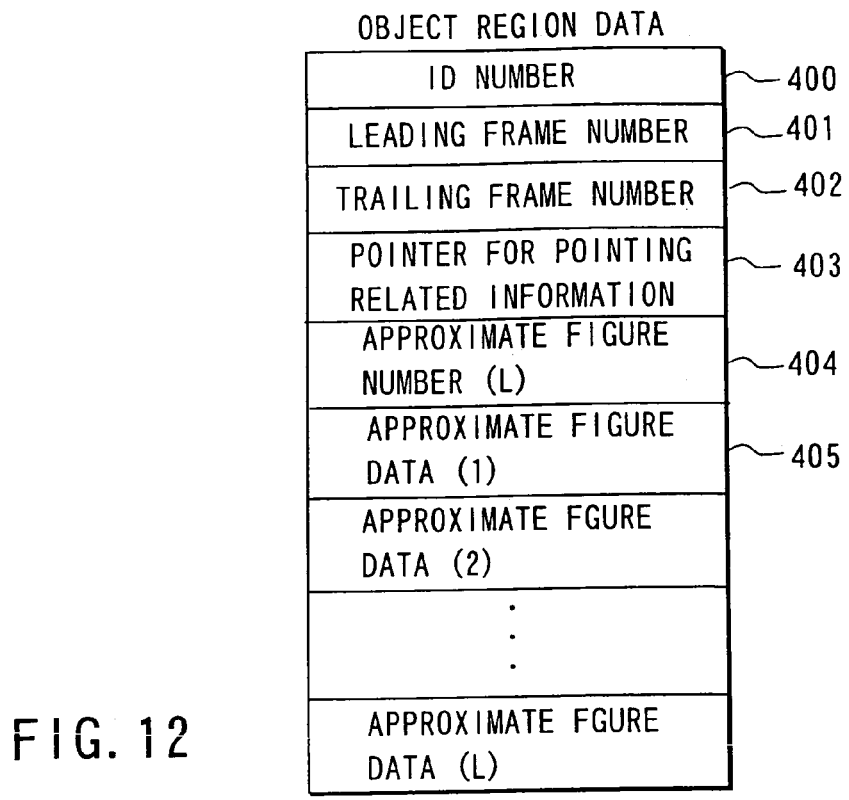
FIG. 12 is a diagram showing an example of the structure of object region data including data of a plurality of approximate figures.

Each of the divided regions is subjected to the process which is performed by the example of the structure shown in FIG. 1 or the procedure shown in FIG. 10 so that data of the approximate figure is produced. In the foregoing case, the spline function, which must be described in object region data of one object increases as the number of the approximate figures increases. Therefore, the structure of data is formed which includes approximate figure data 405 by the number (L in the foregoing case) corresponding to the approximate figure number 404, as shown in FIG. 12.

As described above, the field for the approximate figure number 404 may be omitted by making the approximate figure number to always be one (therefore, data of the approximate figure is made to always be one) to the object region data. In the foregoing case, one object can be expressed with a plurality of figures when object region data is produced for each figure approximating one object (the same ID number is given). That is, approximate figure data (1) to approximate figure data (L) 405 shown in FIG. 12 is required to be substituted for partial data (1) to partial data (L) in a certain region (for example, a region 605).

When one object is expressed with a plurality of figures in this embodiment, the same figure is employed. A mixture of a plurality types of figures may be employed.

Variation of a method of use of region data produced and recorded in this embodiment will now be described. Although a person, an animal, a building or a plant is considered as the object in a video, the process according to this embodiment may be applied to any object in the video. For example, a telop may be handled as an object in a video. Therefore, a process in which a telop is employed as the variations of the object will now be described.

The telop is character information added to the image. In U.S. character information called a "closed caption" must be added. In broadcasts in Japan frequencies of use of telops have been increased. The telop which must be displayed includes a moving telop, such as a still telop, a telop which is scrolled upwards in the screen and a telop which is scrolled from right to the left of the screen. When the region in which the telop is being displayed is approximated with a figure to store the telop character train as related information, the contents of the image can easily be recognized or a predetermined image can easily be retrieved.

The region extracting portion 101 performs a process by employing a method with which a telop region is manually specified. Another method may be employed which has been disclosed in "Method of Extracting Character Portion from Video to Recognize Telop" (Hori, 99-CVIM-114, pp. 129-136, 1999, "Information Processing Society of Japan Technical Report") and with which the brightness and edge information of characters are employed to perform character train extracting method. Another method has been disclosed in "Improvement in Accuracy of Newspaper Story Based on Telop Character Recognition of News Video" (Katayama et al. Vol. 1, pp. 105-110, proceedings of Meeting on Image (Recognition and Understanding (MIRU '98)) to separate background and the telop from each other by examining the intensity of edges. Thus, the telop region is extracted. Each character and each character train may be cut from the obtained telop region. Edge information in the telop region in successive frames is compared with each other to detect a frame in which the telop has appeared and a frame in which the same has disappeared.

The region figure approximating portion 102 performs a process to approximate the telop region extracted by the region extracting portion 101 with a rectangle. The number of the frequency in which the telop has appeared is stored in the leading frame number of object region data (401 shown in FIG. 5 or FIG. 12). On the other hand, the frame in which the telop has disappeared is stored in the trailing frame number 402. A pointer for pointing the character train information of the telop is stored in the related information pointer 403 for pointing related information. As approximate figure data 405, rectangular region data encircling the telop is stored. When each row of a telop composed of a plurality of rows is made to be an individual region or when each character is made to be an individual region, the number of rows or characters is stored in the approximate figure number 404. Rectangular region data encircling each row or character, that is, approximate figure data 405, is stored by the corresponding number.

The figure-representative-point extracting portion 103 and the representative point trajectory curve approximating portion 104 perform processes as described above because any specialized portion for the telop is included in the processes.

The character train information of the telop which has appeared is stored in the related information storage portion 105. Moreover, the pointer for pointing information above is stored in telop region data (object region data).

When a keyword has been input and a character train corresponding or relating to the keyword is included in the character train information of the telop, the frame and time at which the character train appears can easily be detected. If the image is a news program, retrieval of interesting articles is permitted to look only the articles.

In the foregoing case, addition of a pointer for pointing object region data corresponding to the frame or time to the character train information of the telop facilitates the retrieval.

Thus, the telop is processed as described above. Variations of the object may be applied to the method of using this embodiment.

Although the method of approximation using the ellipse has been described in the structure shown in FIG. 2, an approximation method using a rectangle will now be described as another approximation method.

Figures 13A, 13B:
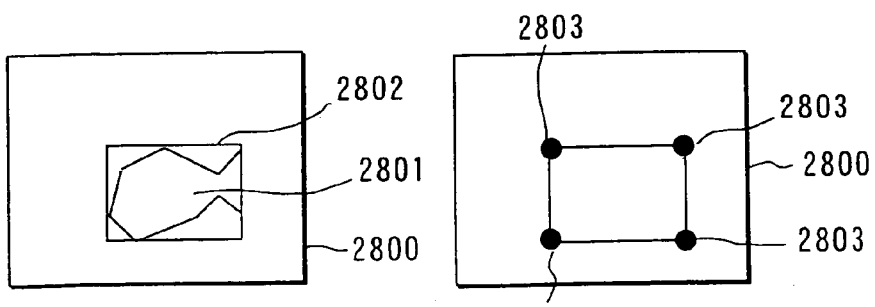
FIGS. 13A, 13B and 13C are diagrams schematically showing another process for describing an object region in a video with object region data.
Figure 13C:
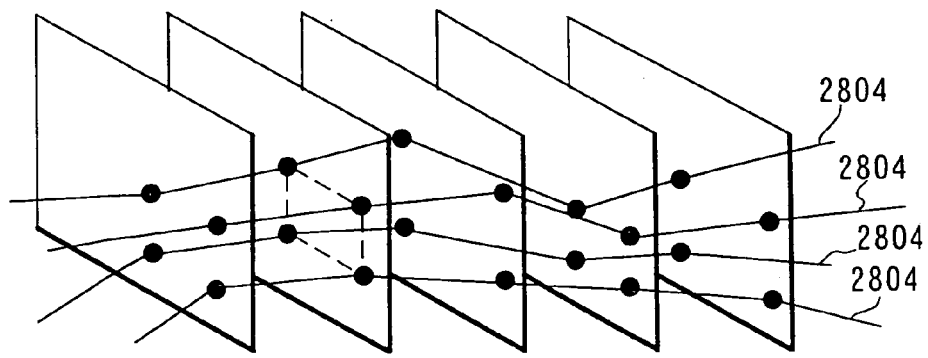

FIGS. 13A, 13B and 13C are diagrams formed into the same shape as that of FIGS. 2A, 2B, 2C and 2D. In the foregoing case, the region figure approximating portion 102 employs a method of approximating a region with a rectangle. The figure-representative-point extracting portion 103 employs a method of extracting the four vertices of the rectangle. The representative point trajectory curve approximating portion 104 employs an approximation method using a spline function.

Referring to FIG. 13A, reference numeral 2800 represents video data for one frame which is to be processed.

Reference numeral 2801 represents an object region which is to be extracted. A process for extracting the region 2801 of the object is performed by the region extracting portion 101.

Reference numeral 2802 represents a result of approximation of the object region with the rectangle. The process for obtaining the rectangle 2802 from the object region 2801 is performed by the region figure approximating portion 102.

Figure 14:
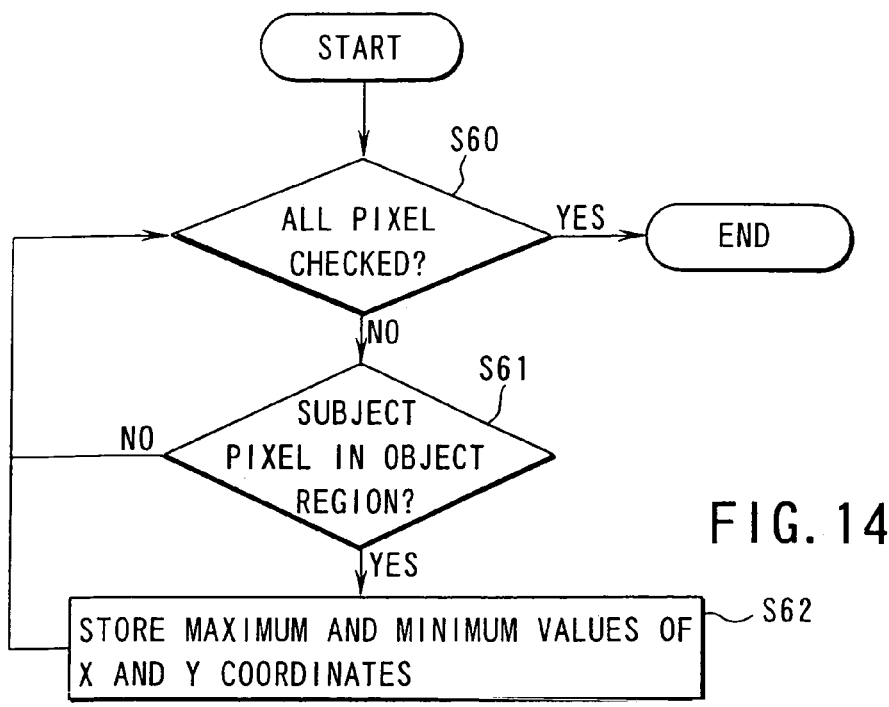
FIG. 14 is a flowchart showing an example of a procedure for obtaining an approximate rectangle.

An example of the process for obtaining the rectangle 2802 shown in FIG. 13A is shown in FIG. 14. That is, a mask image of the frame 2800 is raster-scanned (step S60). When the subject pixel is included in the object region (step S61), the minimum value is updated if each of the X and Y coordinates is smaller than the stored minimum value. If the values are larger than the maximum value, the maximum value is updated (step S62). The foregoing process is repeated and checked for all of the pixels so that the minimum and maximum values of the pixel position indicating the object region 2801 for each of the X and Y coordinates are obtained. Thus, the coordinates of the four vertices of the rectangle 2802 can be obtained.

Figure 15:
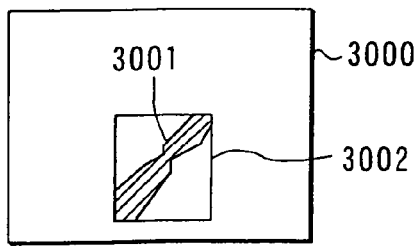
FIG. 15 is a diagram showing a state in which an inclined and elongated object is approximated with a non-inclined rectangle.

Although the above-mentioned method is excellent in easiness of the process, a multiplicity of non-object regions are undesirably contained in the approximate rectangle 3002 when, for example, as shown in FIG. 15, an elongated object 3001 exists diagonally with respect to a screen 3000. When the elongated object is rotated, the size and shape of the rectangle 2802 are changed. The foregoing facts sometimes obstruct identification and instruction of the object.

An example of the approximation method well now be described with which the size of the rectangle can be minimized (the number of the non-object regions in the approximate rectangle can be minimized) and to which the attitude of the object can be reflected.

Figure 16A:
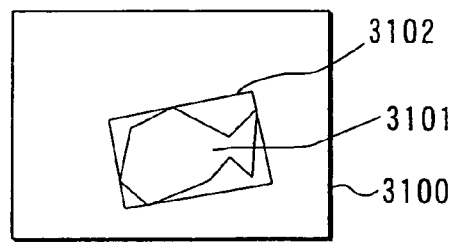
FIGS. 16A and 16B are diagrams showing a state in which an object has been approximated with a rectangle having an inclination corresponding to the inclination of the object.

Referring to FIG. 16A, reference numeral 3100 represents a video for one frame which is to be processed.

Reference numeral 3101 represents an object region which is to be extracted. A process for extracting the object region 3101 is performed by the region extracting portion 101.

Reference numeral 3102 represents a result of approximation of the object region. As distinct from the rectangle 2802 shown in FIG. 13A, the foregoing approximate rectangle 3102 is inclined. Also only a small number of the non-object regions exists in the region 3102. When the subject has been rotated, the shape of the region 3102 is not changed. The process for obtaining the rectangle 3102 from the object region 3101 is performed by the region figure approximating portion 102.

Figure 17:
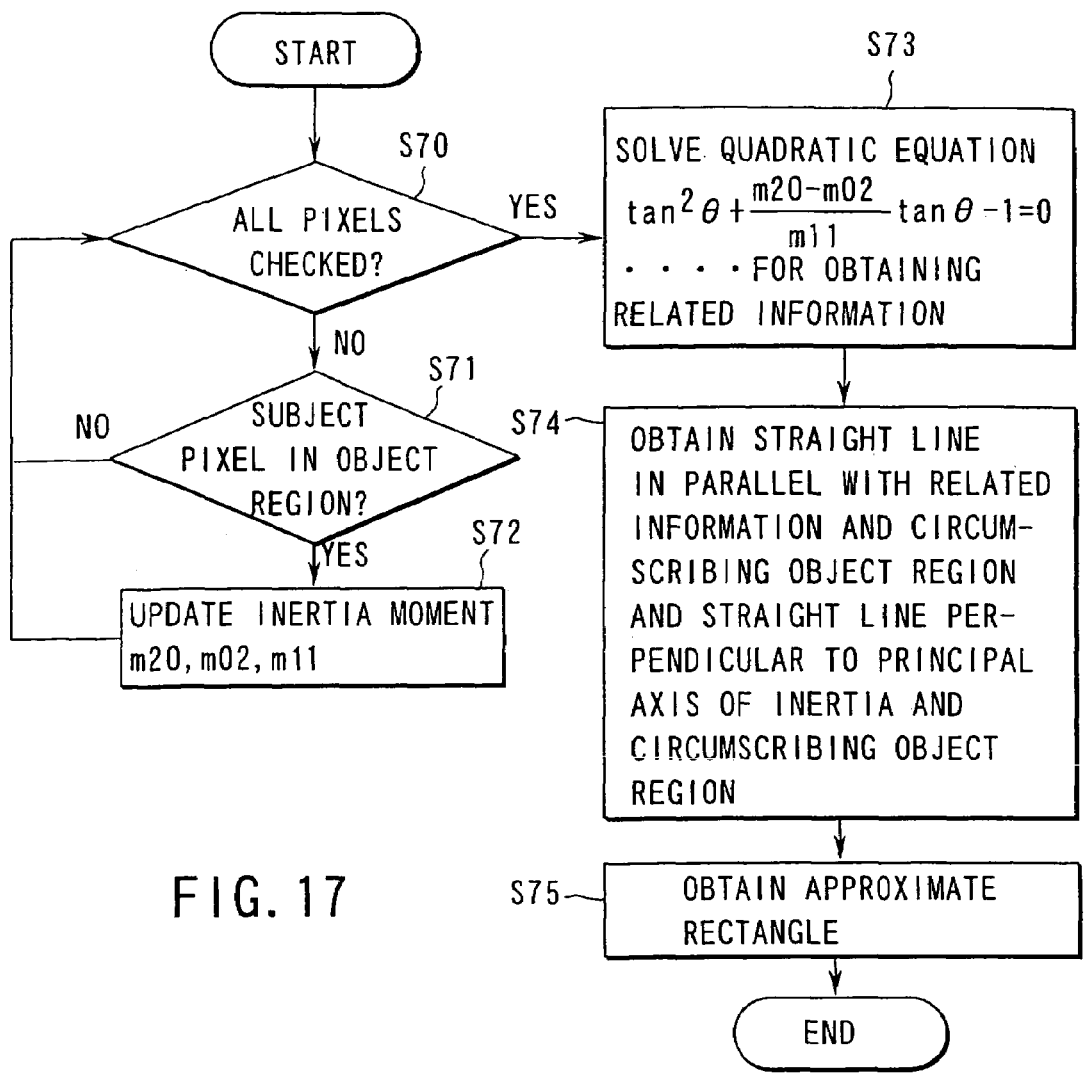
FIG. 17 is a flowchart showing another example of a procedure for obtaining the approximate rectangle.

FIG. 17 shows an example of the process. The process is arranged such that a principal axis of inertia of the object region is obtained. Moreover, an approximate figure is obtained in accordance with the principal axis of inertia.

Figure 16B:
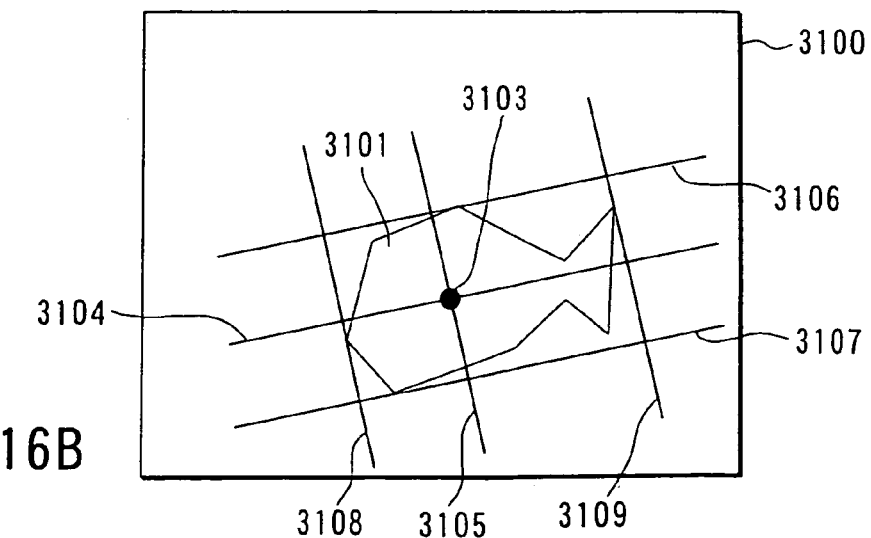

Referring to FIG. 16B, reference numeral 3103 represents the centroid of the object region 3101.

Reference numeral 3104 represents the principal axis of inertia of the object region 3101. Reference numeral 3105 represents a straight line perpendicular to the centroid 3104.

Initially, inertia moments $m_{20}$, $m_{02}$ and $m_{11}$ of the object region are obtained (steps S70 to S72).

Assuming that the mask image is f(x, y), f(x, y) is 1 in the region 3101 and 0 on the outside of the region 3101. The inertia moment of the subject 3101 can be expressed as follows:

$$m_{ij} = \Sigma\Sigma x^i y^j f(x,y)$$

The inertia moment of f(x, y) with respect to a straight line y=x tan θ passing through the origin is obtained as follows:

$$m_\theta = \int\int (x \sin\theta - y \cos\theta)^2 f(x,y) dx\, dy$$

An assumption is made that the angle with which $m_\theta$ is minimized when θ has been, changed is $\theta_0$. When only one set of angles exists, the straight line y=x tan $\theta_0$ is called the principal axis of inertia.

Note that tan $\theta_0$ can be obtained as a solution of the following quadratic equation:

$$\tan^2 \theta + \{(m_{20}-m_{02})/m_{11}\} \tan\theta - 1 = 0$$

When tan $\theta_0$ is obtained around the centroid 3103, the related information of the object can be obtained (step S73).

Then, a straight line in parallel with the principal axis of inertia and circumscribing the object region and a straight line perpendicular to the principal axis of inertia and circumscribing the object region are obtained (step S74).

Referring to FIG. 16B, straight lines 3106 and 3107 are in parallel with the principal axis of inertia 3104. The straight lines 3106 and 3107 circumscribes the object region.

Straight lines 3108 and 3109 are straight lines in parallel with the straight line 3105, the straight lines 3108 and 3109 circumscribing the object region.

The rectangle 3102 is formed by the straight lines 3106, 3107, 3108 and 3109 (step S75).

When the object is formed into a circle, the principal axis of inertia cannot be obtained. In the foregoing case, a procedure, for example, as shown in FIG. 14, may be employed to obtain an approximate rectangle.

Figure 18:
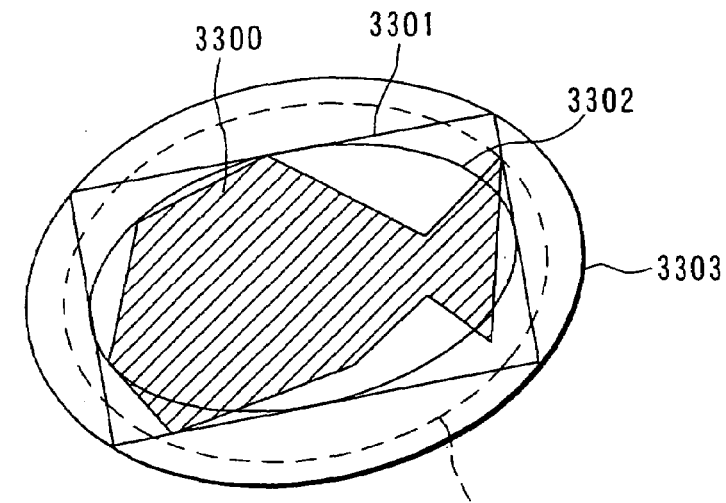
FIG. 18 is a diagram showing a method of obtaining an approximate ellipse from an approximate rectangle.
Figure 19:
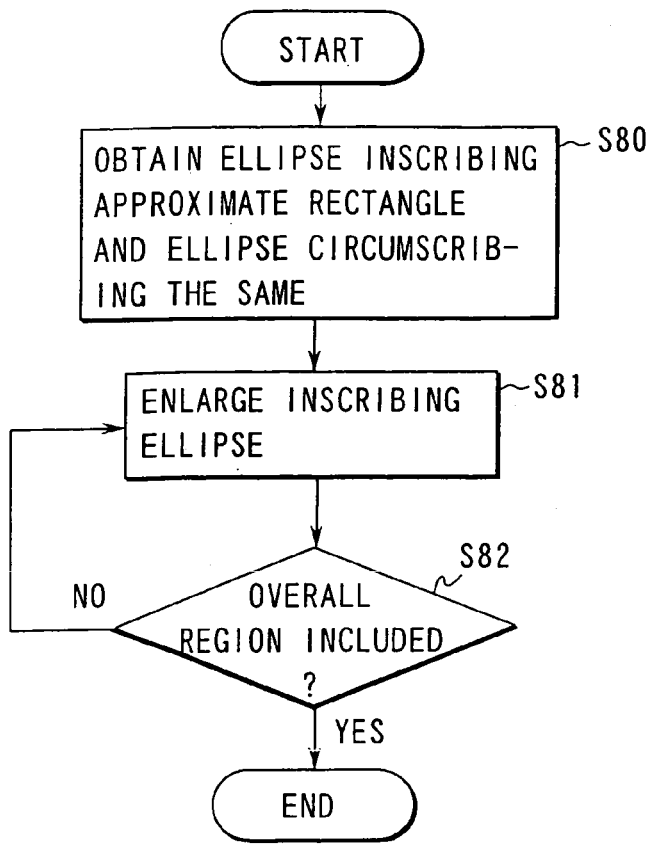
FIG. 19 is a flowchart showing an example of a procedure for obtaining an approximate ellipse from an approximate rectangle.

The object region can sometimes more satisfactorily be expressed by an ellipse as compared with expression by the rectangle. FIG. 18 shows an example of a method of an approximate ellipse from a rectangle when the object region is expressed with the rectangle. FIG. 19 shows an example of a process employed in the foregoing case.

Referring to FIG. 18, an assumption is made that an object region 3300 and a circumscribing rectangle 3301 have been obtained.

Initially, the inscribing ellipse and the circumscribing ellipse of the approximate rectangle 3301 are obtained (step S80).

Referring to FIG. 18, an ellipse 3302 is an inscribing ellipse of the rectangle 3301 and the ellipse 3303 is an circumscribing ellipse of the rectangle 3301.

Then, the size of the inscribing ellipse 3302 is gradually brought closer to that of the circumscribing ellipse 3303 (step S81). Then, an ellipse 3304 for completely including the object region 3300 is obtained (step S82) to employ the ellipse 3304 as the approximate ellipse. The unit for enlarging the size of the inscribing ellipse 3302 in each process of the repeated process may previously be determined. The unit may be determined in accordance with the difference between the size of the inscribing ellipse 3302 and that of the circumscribing ellipse 3303.

A reverse method may be employed with which the size of the circumscribing ellipse 3303 is brought closer to the size of the inscribing ellipse 3302. In the foregoing case, the circumscribing ellipse 3303 includes the object region 3300 from the first. Therefore, the ellipse previous to the ellipse with which the portion which is not included in the object region 3300 has first occurred in the repeated process is required to be the approximate ellipse 3304.

Then, the figure-representative-point extracting portion 103 obtains the representative points of the approximate rectangle or the approximate ellipse. The representative points of a rectangle may be the four or three vertices of the rectangle. The representative points of the ellipse may be the vertices of the circumscribing rectangle or two focal points and one point on the ellipse.

Then, the representative point trajectory curve approximating portion 104 approximates the trajectory of the representative points obtained in the time sequential manner with a spline function or the like. At this time, it is important to bring the time sequences into correspondence with each other. When the approximate figure is in the form of a rectangle and having the representative points which are the vertices, the vertices of the adjacent frames must be brought into correspondence with each other.

Figure 20:
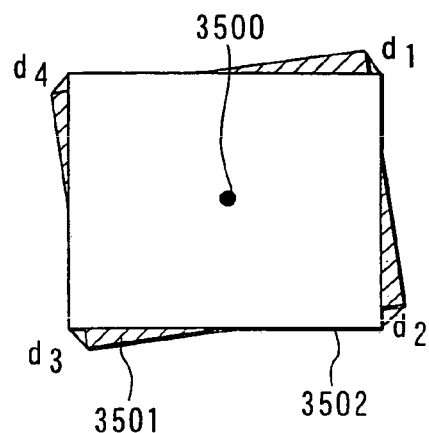
FIG. 20 is a diagram showing a method of making representative points of approximate figures to correspond to one another between adjacent frames.
Figure 21:
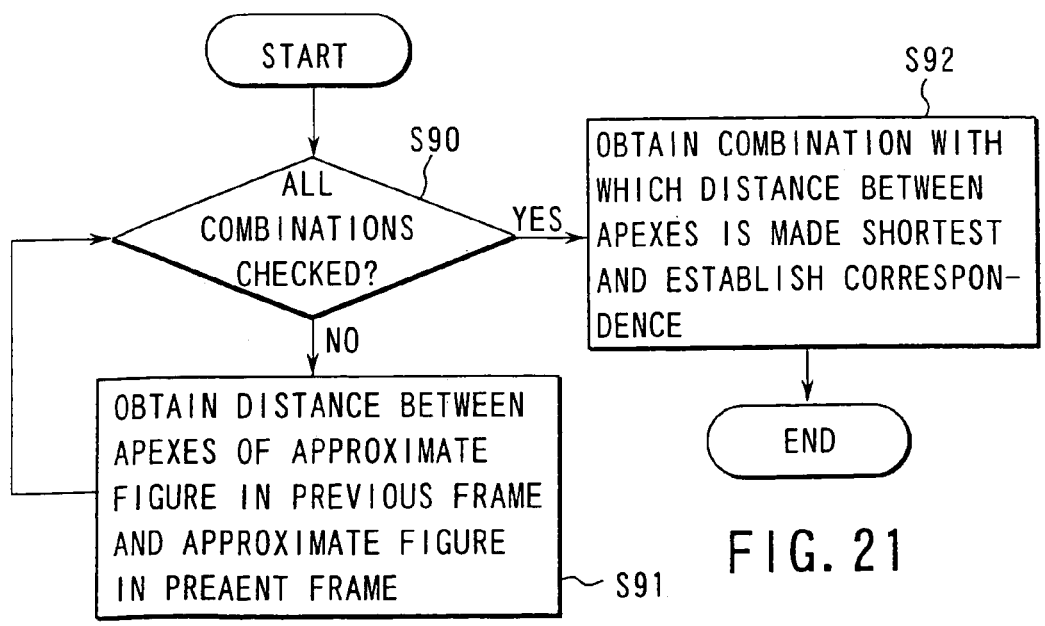
FIG. 21 is a flowchart showing an example of a procedure for making representative points of approximate figures to correspond to one another between adjacent frames.

FIG. 20 shows an example of a method of a correspondence process. FIG. 21 shows an example of the procedure of the correspondence process.

Referring to FIG. 20, reference numeral 3500 represents the centroid of the approximate rectangle. A rectangle 3501 in the previous frame and a rectangle 3502 in the present frame have been obtained. Either of the rectangle 3501 or 3502 is moved in parallel to make the centroids to coincide with each other (a state in which the centroids have been made coincide with each other is shown in FIG. 20). Distances d1 to d4 between the vertices of the two rectangles are calculated to obtain the sum of the distances in the, combinations of all of the vertices (steps S90 and S91). A combination with which the sum of the distances made to be shortest is detected to establish the correspondence (step S92).

When representative points are obtained from the approximate figure, the number of combinations which is obtained in step S91 can be reduced when the representative points are obtained by a predetermined rule. When the coordinates of the vertices of a rectangle are stored clockwise, only four combinations is required for the correspondence.

The foregoing method sometimes has difficulty in realizing the corresponding state. When the approximate rectangle is formed into a square-like shape between the adjacent frames and the approximate rectangle has been rotated by 45°, the corresponding state cannot easily be realized (because the sums of the distances are made to be similar values between the two combinations). In the foregoing case, a method may be employed with which the exclusive OR is obtained between the regions of the object in the approximate rectangle to employ a combination with which the area is minimized. Another method may be employed with which an absolute difference between textures of the object region is obtained to detect a combination with which the difference is minimized.

An example will now be described in which when a trajectory of the object region is described by the method according to the present invention, the structure of data which is different from the approximate data structure shown in FIGS. 6 and 7 is employed.

Figure 22:
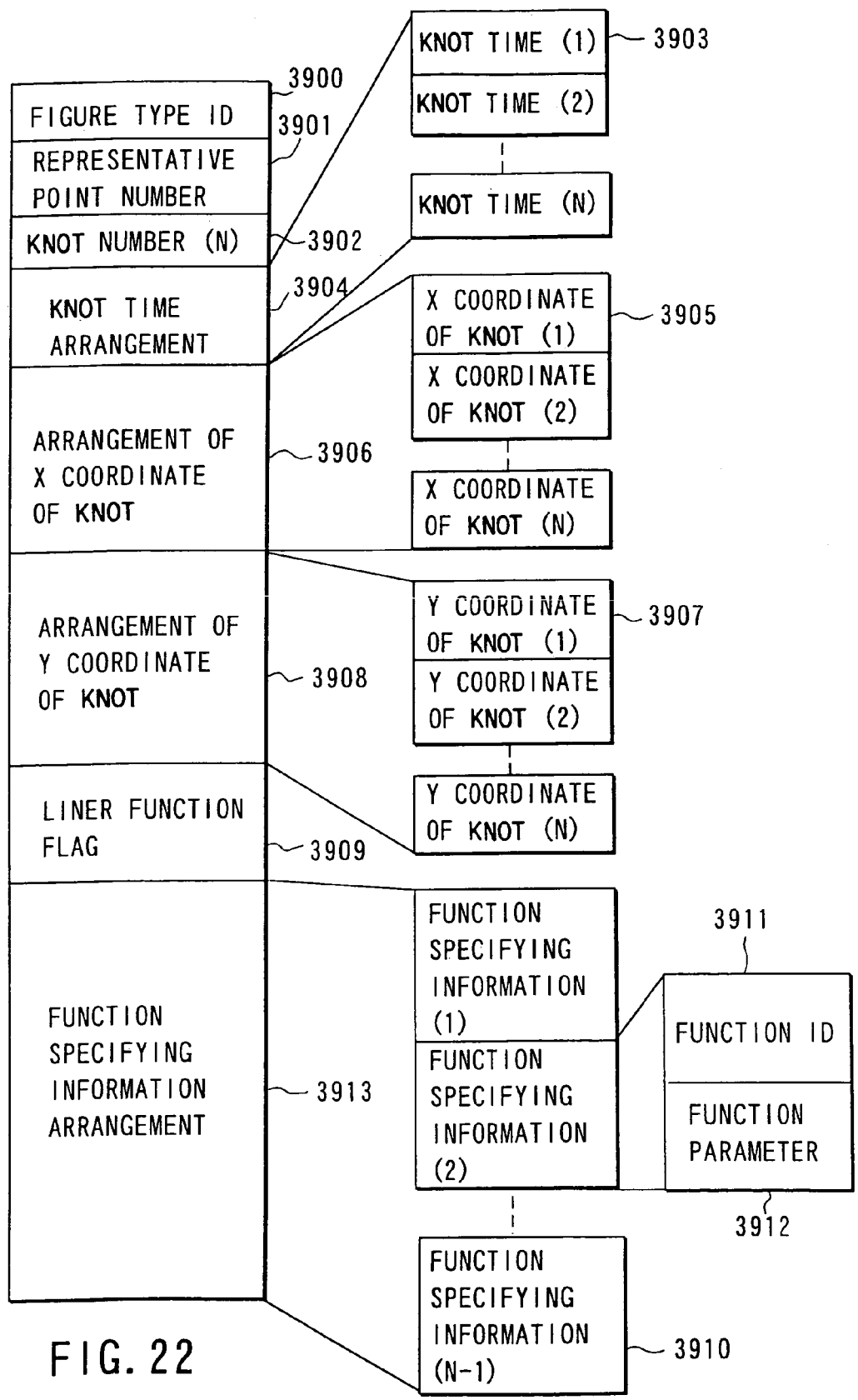
FIG. 22 is a diagram showing another example of the structure of object region data.

FIG. 22 shows another example of a description format for data of the approximate figure and data of trajectories of representative points of the object region. Note that FIG. 22 shows only one representative point for a portion (portion from knot number (N) 3902 to a function specifying information arrangement 3913) of data of the trajectory of the representative point (in actual, a plurality of representative points are described to correspond to the number of the representative points).

Description will now be made on the assumption that the highest order of the polynomial is the second order.

In the foregoing example (shown in FIGS. 5, 6 and 7), all of the coefficients of the polynomial spline function are described. The description method in this example is arranged to use combination of the coordinate of the knot of the spline function and a value relating to the second-order coefficient of the spline function. The foregoing description method has an advantage that the knot can easily be extracted to cause the trajectory of a large object to easily be detected.

The foregoing description method will now be described.

The figure type ID 3900 shown in FIG. 22 specifies the type of the figure which has been used to make the approximation of the shape of an object. For example, only the centroid, the rectangle, the ellipse or their combination can be specified. FIG. 23 shows an example of types of the figures and assignment of the figure type ID. A representative point number 3901 indicates the number of the trajectories of the representative points which are determined in accordance with the type of the figure.

The knot number (N) 3902 indicates the number of knots of a spline function expressing the trajectory of the representative point. The frame corresponding to each knot is expressed as time so as to be stored in knot time (1) to knot time (N) 3903. Since a predetermined number of knot time has been provided, the knot time is described as knot time arrangement 3904.

Also x and y coordinates of each knot are described as arrangements 3906 and 3908 of X coordinate 3905 of the knot and the Y coordinate 3907 of the knot.

A linear function flag 3909 indicates whether or not only a linear function is employed as the spline function between knots. If second or higher order polynomial is partially employed, the foregoing flag 3909 is turned off. Since the foregoing flag 3909 is employed, description of function specifying information 3910 to be described later which is employed when only the linear function is employed as the approximate function can be omitted. Therefore, an advantage can be realized in that the quantity of data can be reduced. Note that the flag may be omitted.

A function ID 3911 and a function parameter 3912 contained in function specifying information 3910 indicate the order of the polynomial spline function and information for specifying the coefficient of the polynomial spline function, respectively FIG. 24 shows their examples. Note that ta and tb are time of continuous knots, f(t) is a spline function in a region [ta, tb] and, fa and fb are coordinates of the knot at time ta and tb. Since information about the knot is sufficient information when a liner polynomial is employed, no function parameter is described. When a quadratic polynomial is employed, one value is described in the function parameter as information for identifying the coefficient. Although the quadratic coefficient is employed in the example shown in FIG. 24, another value, for example, one point on the quadratic curve except for fa and fb may be employed.

The foregoing description method is able to regenerate the spline function in all regions in accordance with information about the knots and the function parameter under the limitation conditions shown in FIG. 24.

Function specifying information 3910 exists by the number corresponding to knot number N–1, the function specifying information 3910 being described as an arrangement 3913.

Although the description has been made that the highest order of the polynomial is the quadratic order, the highest order of the polynomial may, of course, be a cubic or higher order.

The variations of related information will now be described.

FIG. 25 shows an example of the structure of data 4200 about related information for use in a monitor video. Actual data is required to contain at least one item.

An object type 4201 is data indicating the type, such as a "vehicle" or a "person", of an object to which approximation is made.

Identification information 4202 is data for identifying an actual object, such as "name of a person", "the license number of a vehicle" or "the type of the vehicle".

An operation content 4203 is data indicating the operation, such as "walking" or "running" of the object.

FIG. 26 shows an example of the structure of data 4300 about related information for mainly use in a commercial contents or hyper media contents. Actual data is required to contain at least one item.

Name 4301 is data indicating name of the object. In a case where the object is a character of a movie or the like, name of the player or the actor is specified.

Copyright information 4302 is data indicating information relating to the copyright of a copyright holder of the object.

A copy permission information 4303 is data indicating whether or not video information in a range contained in the figure approximating the object is permitted to be cut and re-used.

A foot mark 4304 is data indicating the time at which the object has finally been edited.

URL 4305 of related information formed by expressing data to which a reference must be made when related information of the object is displayed by using URL.

Access limit information 4306 is data about information permission/inhibition of audience and jump owing to a hyper link for each object and data for setting permission condition.

Billing information 4307 is data indicating billing information for each object.

Annotation data 4308 is data for aiding related information of the object and the operation.

Since a relatively small number of related information items shown in FIGS. 25 and 26 exists, it is preferable that related information is described in object region data.

A method of providing video data and object region data will now be described.

When object region data produced owing to the process according to this embodiment is provided for a user, a creator must provide object region data for the user by a method of some kind. The object region data may be provided by any one of the following methods.

(1) A method with which video data, its object region data and its related information are recorded in one (or a plurality of) recording medium so as to simultaneously be provided.

(2) A method with which video data and object region data are recorded in one (or a plurality of) recording medium so as to simultaneously be provided. However, related information is individually provided or provision of the same is not performed (the latter case is a case in which related information can individually be acquired through a network or the like if provision is not performed).

(3) A method with which video data is solely provided. Moreover, object region data and related information are recorded in one (or a plurality of) recording medium so as to simultaneously be provided.

(4) A method with which video data, object region data and related information are individually provided.

The recording medium is mainly used to perform provision in the foregoing case. Another method may be employed with which a portion or the overall portion of data is provided from a communication medium.

As described above, the structure according to this embodiment is able to describe the object region in a video as a parameter of a curve approximating the time-sequential trajectory (the trajectory of the coordinates of the representative points having the frame numbers or time stamps as the variables) of the coordinates of the representative points of the approximate figure of the object region.

Since this embodiment enables the object region in a video to be expressed with only the parameters of the function, object region data, the quantity of which can be reduced and which can easily be handled, can be generated. Moreover, expression of the representative points and generation of the parameters of the approximate curve can easily be performed.

According to this embodiment, whether or not arbitrary coordinates specified by a user indicate the object region can considerably easily be determined. Moreover, it leads to a fact that specification of a moving object in a video can furthermore easily be performed.

Other embodiments of the object-region-data generating apparatus according to the present invention will be described. The same portions as those of the first embodiment will be indicated in the same reference numerals and their detailed description will be omitted.

SECOND EMBODIMENT

The first embodiment has the structure that the representative points of a figure approximating the object region in a video is extracted so as to be converted into object region data. On the other hand, a second embodiment has a structure that characteristic points in the object region in the video are extracted so as to be converted into object region data.

Description will be made about the different structures from those according to the first embodiment.

Figure 27:
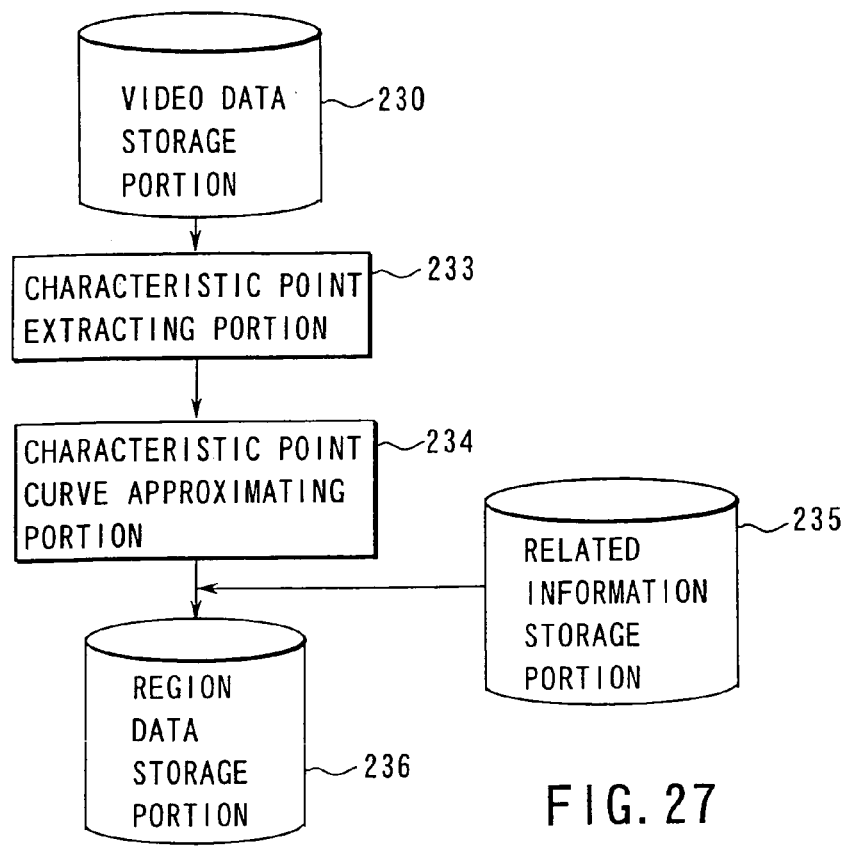
FIG. 27 is a diagram showing an example of an object-region-data generating apparatus according to a second embodiment of the present invention.

FIG. 27 shows an example of the structure of an object-region-data generating apparatus according to this embodiment. As shown in FIG. 27, the object-region-data generating apparatus according to this embodiment incorporates a video data storage portion 230, a characteristic-point extracting portion 233, a characteristic-point-curve approximating portion 234 for approximating the arrangement of characteristic points with a curve, a related information storage portion 235 and a region data storage portion 236.

Referring to FIG. 27, a video data storage portion 230 has the same function as that of the video data storage portion 100 according to the first embodiment. The related information storage portion 235 has the same function as that of the related information storage portion 105 according to the first embodiment. The region data storage portion 236 has the same function as that of the region data storage portion 106 according to the first embodiment.

The characteristic-point extracting portion 233 extracts at least one characteristic point from the object region in the video. The characteristic point may be any one a variety of points. For example, corners of an object (for example, a method disclosed in "Gray-level corner detection, L. Kitchen and A. Rosenfeld, Pattern Recognition Letters, No. 1, pp. 95-102, 1982) or the centroid of the object may be employed. When the centroid of the object is employed as the characteristic point, it is preferable that the portion around the point assumed as the centroid is specified and then automatic extraction is performed.

The characteristic-point-curve approximating portion 234 has a basic function similar to that of the representative point trajectory curve approximating portion 104 according to the first embodiment. That is, the characteristic-point-curve approximating portion 234 time-sequentially approximates, to a curve, the positions of the characteristic points extracted by the characteristic-point extracting portion 233. The approximate curve is, for each of the X and Y coordinates, expressed as the function of the frame number f or the time stamp t given to the video so as to be approximated with a curve by linear approximation or approximation using a spline curve. Data after the approximation has been performed is recorded by a method similar to that according to the first embodiment.

Note that object region data according to this embodiment is basically similar to object region data according to the first embodiment (see FIG. 5). The field for the approximate figure number is not required. Note that "data of the approximate figure" is "data of characteristic points".

Also data of the characteristic point in object region data is basically similar to data of the approximate figure according to the first embodiment (see FIG. 6). Note that the "number of representative points" is the "number of characteristic points". The "data of the trajectory of representative points" is the "data of the trajectory of characteristic points". Note that figure type ID is not required.

Data of the trajectory of the characteristic points included in the data of the characteristic points is similar to data of the trajectory of the representative points according to the first embodiment (see FIG. 7).

Figure 28:
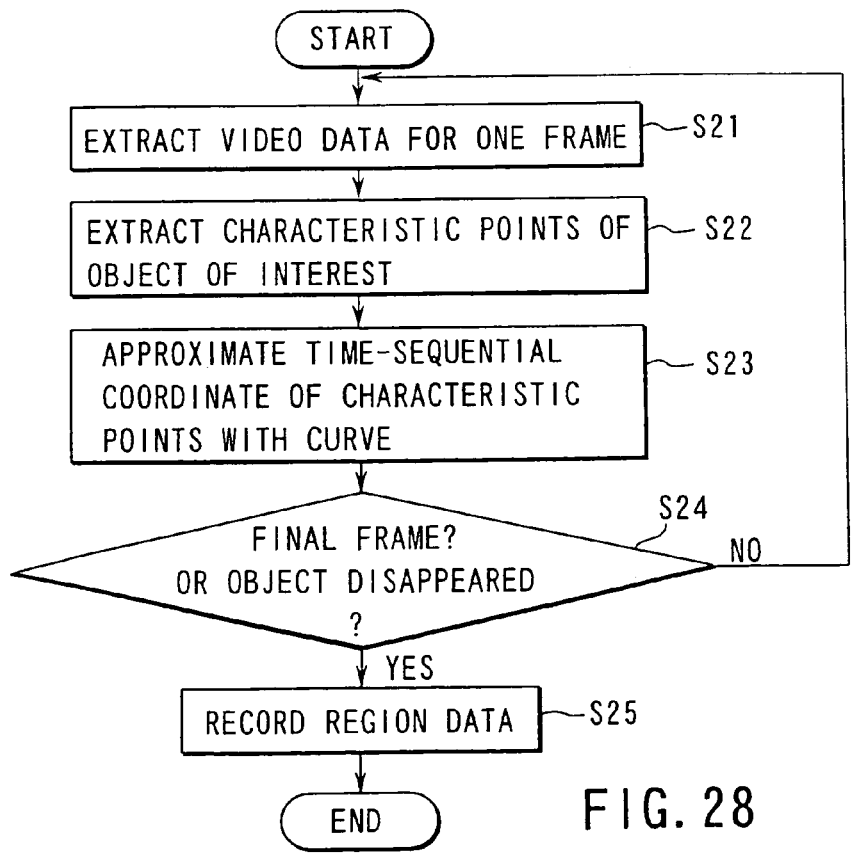
FIG. 28 is a flowchart showing an example of a procedure according to the second embodiment.

FIG. 28 is a flowchart showing an example of a flow of the process of the object-region-data generating apparatus according to this embodiment. The overall flow is similar to that according to the first embodiment. In step S21, video data for one frame is extracted from the video data storage portion 230 similarly to step S11 shown in FIG. 10. Steps S12 to S14 shown in FIG. 10 are made to be step S22 for extracting the characteristic points of the object of interest. The approximation of the position of the representative point train of the approximate figure in the successive frames with a curve in step S15 shown in FIG. 10 is made to be step S23 for making approximation of the position of the characteristic point train of the object region in the successive frames with a curve. Moreover, steps S24 and S25 are similar to steps S16 and S17 shown in FIG. 10.

As a matter of course, the process according to this embodiment can be realized by software.

As described above, the structure according to this embodiment is able to describe the object region in a video as a parameter of a curve approximating the time-sequential trajectory (the trajectory of the coordinates of the characteristic points having the frame numbers or time stamps as the variables) of the characteristic points of the region.

Since this embodiment enables the object region in a video to be expressed with only the parameters of the function, object region data, the quantity of which can be reduced and which can easily be handled, can be generated. Moreover, expression of the characteristic points and generation of the parameters of the approximate curve can easily be performed.

According to this embodiment, whether or not arbitrary coordinates specified by a user indicate the object region can considerably easily be determined. Moreover, it leads to a fact that specification of a moving object in a video can furthermore easily be performed.

Note that object region data based on the representative points of the approximate figure of the object region according to the first embodiment and object region data based on the characteristic points of the object region according to the second embodiment may be mixed with each other.

In the foregoing case, the format of object region data according to the first embodiment is provided with a flag for identifying a fact that object region data is based on the representative points of the approximate figure of the object region or the characteristic points of the object region. As an alternative to providing the flag for the format of object region data according to the first embodiment, when the figure type ID has a specific value, a fact that object region data is based on the characteristic points of the object region is indicated. In the other cases, a fact is indicated that object region data is based on the representative points of the approximate figure of the object region.

The structure of object region data and a creating side have been described. The portion for using the above-mentioned object region data will now be described.

THIRD EMBODIMENT

In the third embodiment, when object region data including related information has been given to the object in the video, a user specifies an object (mainly on a GUI screen) to display related information (display of characters, a still image or a moving image, or output of sound) or causes a related program to be executed.

Figure 29:
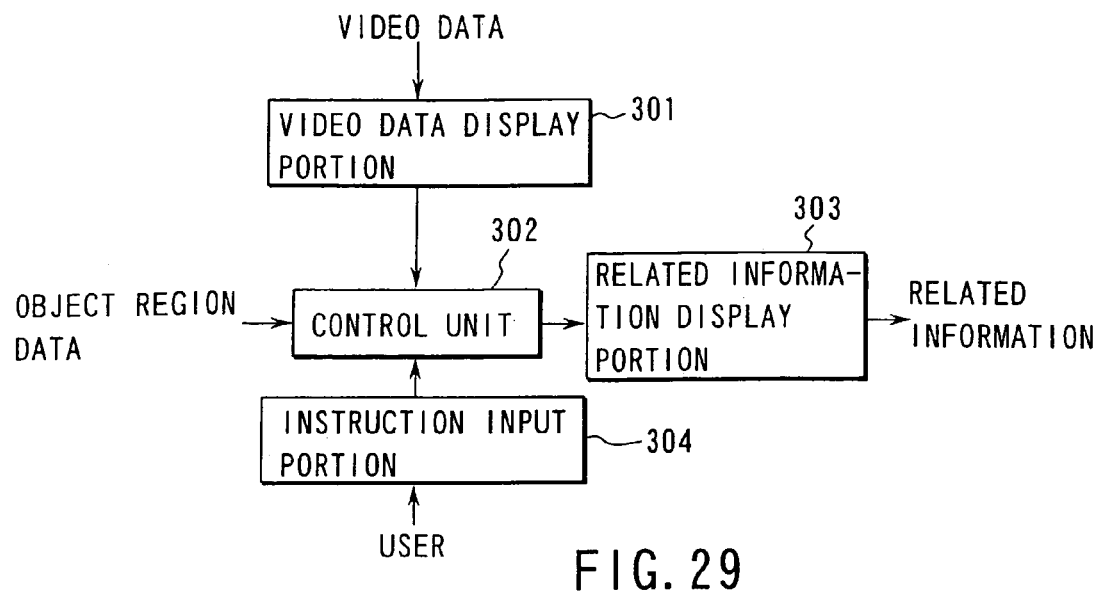
FIG. 29 is a diagram showing an example of the structure of a video processing apparatus according to a third embodiment of the present invention.

FIG. 29 shows an example of the structure of a video processing apparatus according to this embodiment. As shown in FIG. 29, the video processing apparatus according to this embodiment incorporates a video data display portion 301, a control unit 302, a related information display portion 303 and an instruction input portion 304.

The video data display portion 301 displays video data input from a recording medium or the like (not shown) on a liquid crystal display unit or a CRT.

The instruction input portion 304 permits a user to use a pointing device, such as a mouse, or a keyboard to perform an operation, for example, specification of an object in the video displayed on the liquid crystal unit or the CRT. Moreover, the instruction input portion 304 receives input (specification of an object) from the user.

The control unit 302, to be described later, determines whether or not the user has specified the object in the video in accordance with, for example, the coordinates specified by the user on the screen and object region data input from a recording medium (not shown). Moreover, the control unit. 302 makes a reference to the pointer for pointing related information of object region data when a determination has been made that the user has specified a certain object in the video. Thus, the control unit 302 acquires related information of the object to display the related information.

The related information display portion 303 responds to the instruction issued from the control unit 302 to acquire and display related information (from a recording medium or a server or the like through a network).

When the pointer for pointing related information is a pointer for pointing data in which program or the operation of the computer is described, the computer performs a predetermined operation.

As a matter of course, also this embodiment may be realized by software.

A process which is performed when the object region is expressed as an approximate figure similarly to the first embodiment will now be described.

Figure 30:
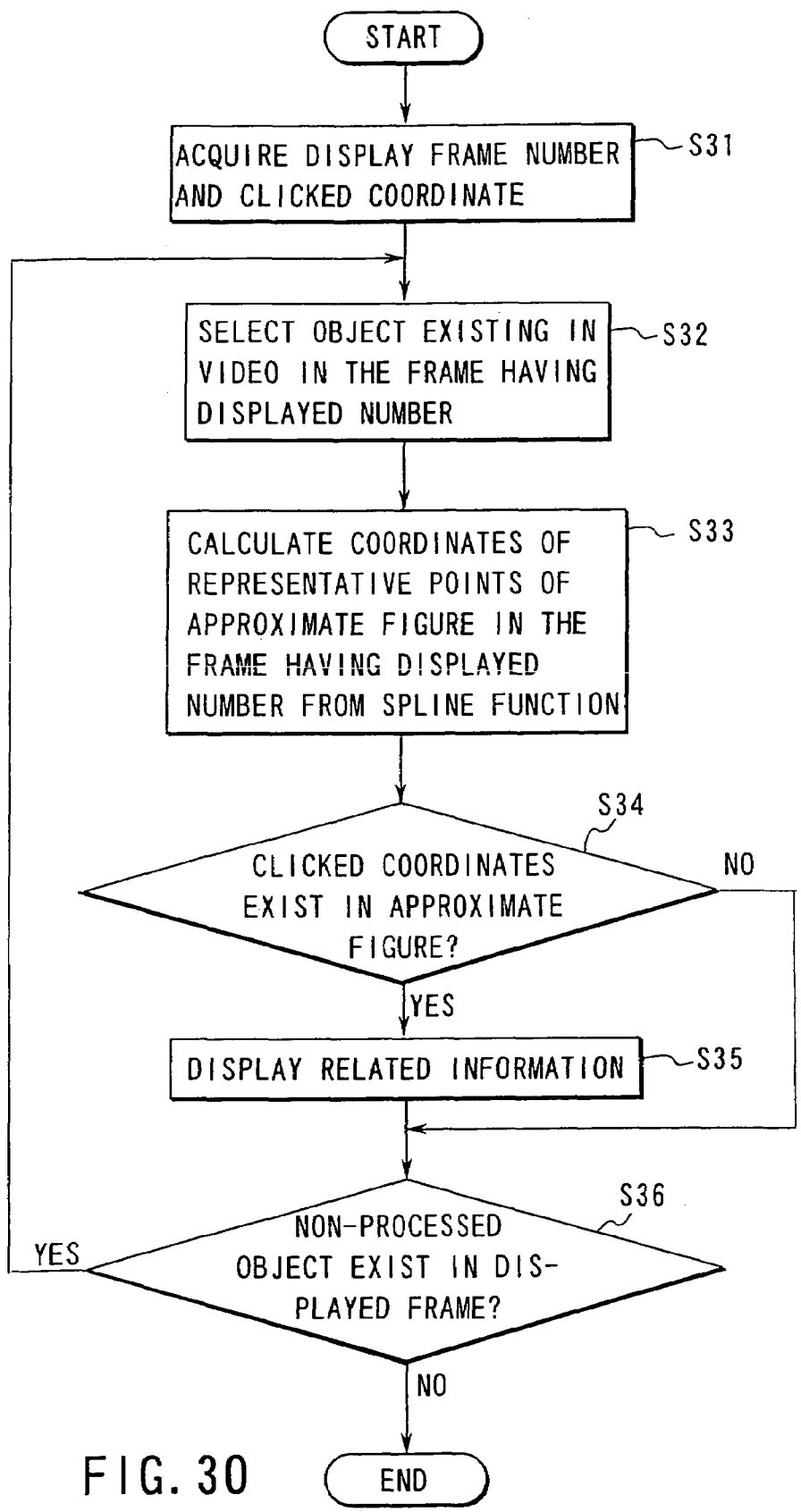
FIG. 30 is a flowchart showing an example of a procedure according to the third embodiment.

FIG. 30 shows an example of the process according to this example. The flowchart shown in FIG. 30 includes only a process which is performed when a certain region in a video which is beings displayed during reproduction of the video is specified by using a pointing device, such as a mouse cursor (basically corresponding to the process which is performed by the control unit 302).

In step S31, the coordinates on the screen specified by using the pointing device or the like are calculated. Moreover, the frame number of the video which is being reproduced at the moment of the instruction is acquired. Note that a time stamp may be employed as a substitute for the frame number (hereinafter the frame number is employed).

In step S32, the object existing in the video having the frame number in which the object has been specified is selected from object region data of the object added to the video. The foregoing selection can easily be performed by making a reference to the leading frame number and the trailing frame number of object region data.

In step S33, data of a spline function (see FIGS. 6 and 7) extracted from object region data of the region selected in step S32 is used to calculate the coordinates of the representative points of the approximate figure in the video display frame number when the object has been specified. Thus, two focal points F and G and point H on the ellipse are obtained in the example according to the first embodiment (see FIGS. 2 and 4).

In step S34, it is determined whether or not the coordinates specified by using the pointing device or the like exist in the object (that is, the approximate figure) in accordance with the discrimination procedure which is decided according to the obtained representative points and the figure type ID of object region data.

When the ellipse is represented by the two focal points and one point on the ellipse similarly to the first embodiment, the determination can easily be made.

When, for example, the Euclidean distance between points P and point Q is expressed by E (P, Q) similarly to the first embodiment, the following inequality is held in a case where the coordinate P specified by using the pointing device exists in the ellipse:

$$E(F,P)+E(G,P) \leq E(F,H)+E(G,H)$$

In a case where the coordinate P exists on the outside of the ellipse, the following inequality is held:

$$E(F,P)+E(G,P) > E(F,H)+E(G,H)$$

The foregoing inequalities are used to determine whether or not the specified point exists in the object. Then, it is determined whether step S35 is performed or omitted (skipped) in accordance with a result of the determination.

When a parallelogram is employed as the approximate figure of the object region in the video; four inequalities are used as a substitution for one inequality in the case of the ellipse to determine whether or not the arbitrary coordinates exist in the object.

When, for example, points A, B and C shown in FIG. 8 are representative points, point D is obtained as follows:

$$D = C + A - B$$

Then, an assumption is made that a point on a straight line passing through the points A and B is Q and the straight line is expressed by the following equation:

$$f_{A,B}(Q) = 0$$

When the point P exists in the figure, the following two inequalities are simultaneously held:

$$f_{A,B}(P) \times f_{C,D}(P) < 0, \text{ and}$$

$$f_{B,C}(P) \times f_{D,A}(P) < 0$$

where $$f_{A,B}(P) = (y_A - y_B) \times (x - x_A) - (x_A - x_B) \times (y - y_A)$$

$$f_{B,C}(P) = (y_B - y_C) \times (x - x_B) - (x_B - x_C) \times (y - y_B)$$

$$f_{C,D}(P) = (y_D - y_C) \times (x - x_C) - (x_D - x_C) \times (y - y_C)$$

$$f_{D,A}(P) = (y_A - y_D) \times (x - x_D) - (x_A - x_D) \times (y - y_D),$$

and $$P = (x,y), A = (x_A, y_A), B = (x_B, y_B), C = (x_C, y_C), D = (x_D, y_D)$$

When approximation to one object with a plurality of approximate figures is made (refer to the approximate figure number shown in FIGS. 5 and 12), the foregoing process is performed for each approximate figure.

In step S35, a process which is performed only when the specified point exists in the object region. In the foregoing case, a reference to the related information pointer 403 for pointing related information contained in object region data (see FIG. 5) is made. In accordance with information about the pointer, related information is acquired so as to be, for example, displayed (in the example of the structure shown in FIG. 29, the foregoing process is performed by the related information display portion 303). When a program has been specified as related information, an specified program is executed or another specified operation is performed. When related information has been described in object region data, related information is required to be displayed.

Figure 31:
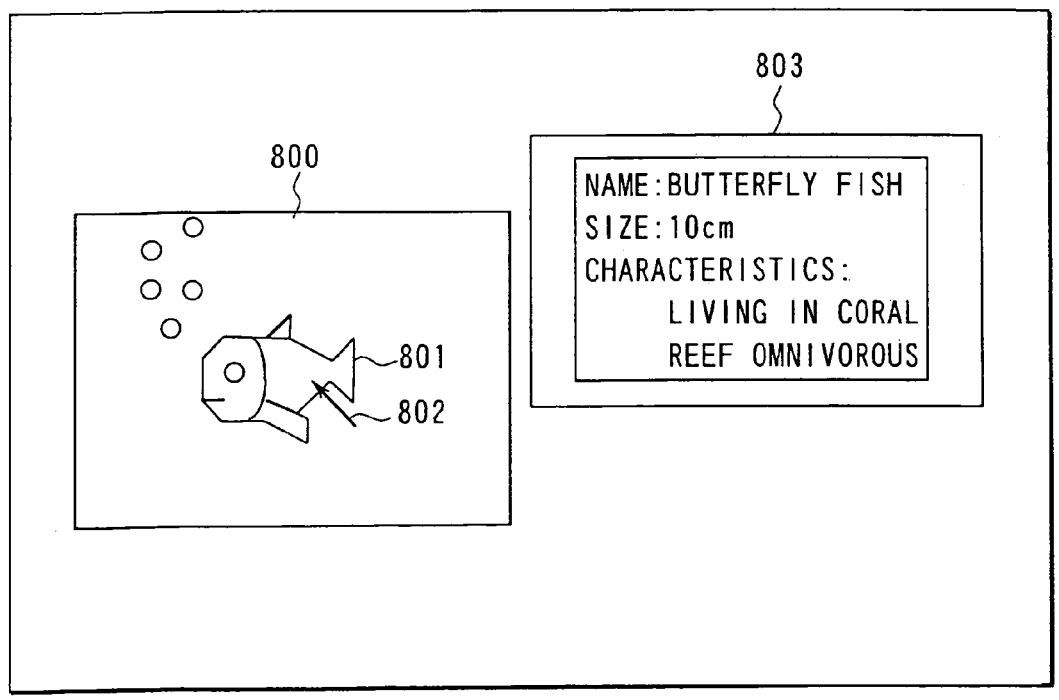
FIG. 31 is a diagram showing an example of display of contents hyper media which uses object region data.

FIG. 31 shows an example of a case where description (a text) of an object in a video has been given as the related information. When the coordinates specified by using the pointing device 802 during reproduction of a video 800 exist in the object region 801 (a figure approximating the object 801), related information 803 is displayed on an individual window.

In step S36, a branching process is performed so that it is determined whether or not an object having object region data furthermore exists in the frame in which the object has been specified. If the object exists, the process proceeds to step S32. If the object does not exist, the operation is completed.

When a plurality of regions overlap, either or both of the regions may arbitrarily be selected.

A process which is performed when the object region is expressed as characteristic points of the object similarly to the second embodiment wilt now be described.

The portions different from those according to the first embodiment will mainly be described.

Figure 32:
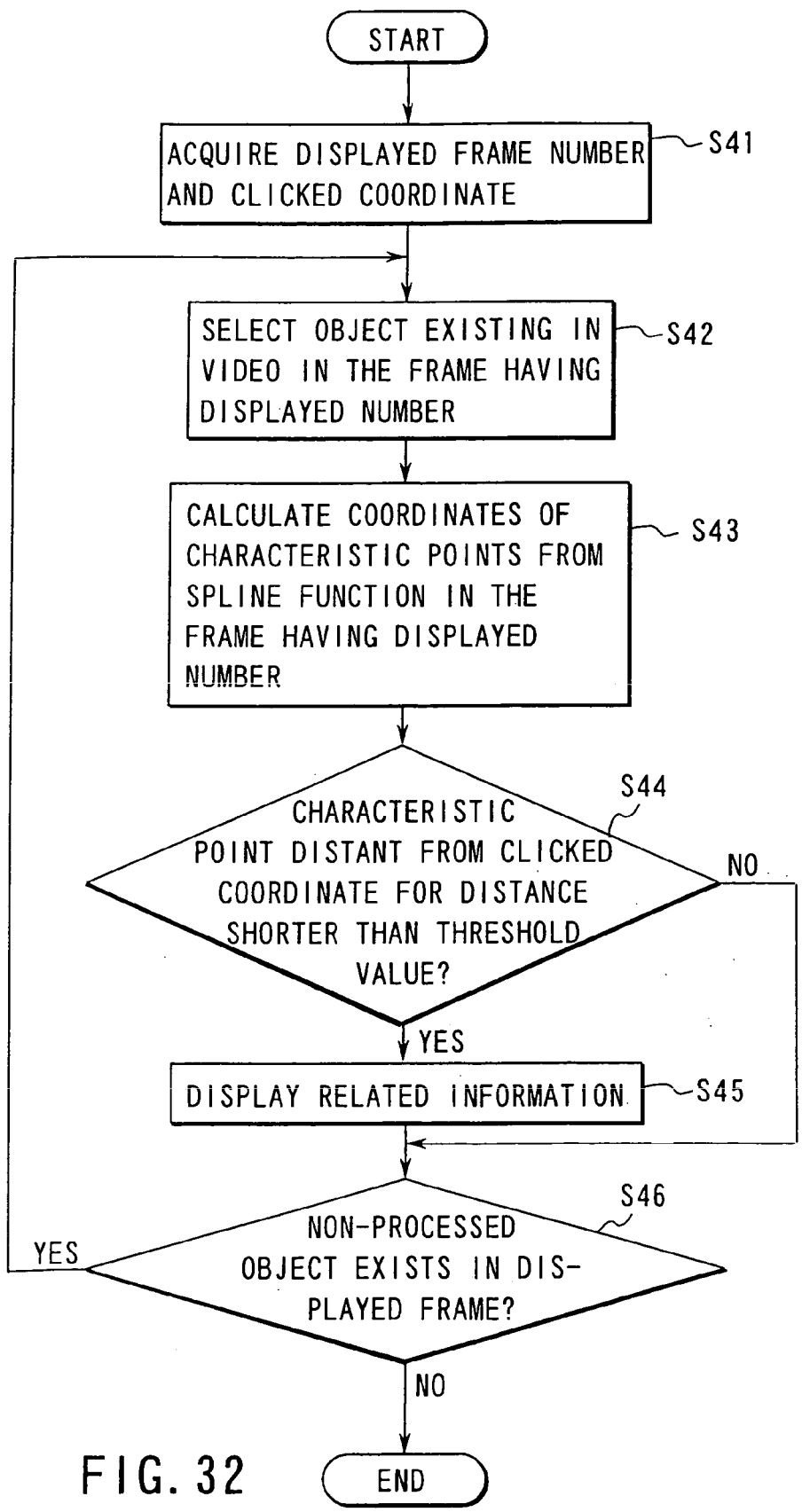
FIG. 32 is a flowchart showing another example of the procedure according to the third embodiment.

FIG. 32 shows an example of the procedure according to this example. Note that the flowchart shown in FIG. 32 includes only a process (basically, corresponding to the process which is performed by the control unit 302) which is performed when a certain region in a video which is being displayed during reproduction of the video has been specified by using a pointing device, such as a mouse cursor. Since the overall flow is similar to that of the flowchart shown in FIG. 30, different portions will mainly be described (steps S41, S42, S45 and S46 are similar to steps S31, S32, S35 and S36).

In step S43, the coordinates of the position of the characteristic point of an object in a displayed frame number are calculated from object region data. When a plurality of characteristic points exist, the coordinates of all of the characteristic points are calculated.

In step S44, the distance between the position of the characteristic point calculated in step S43 and the coordinates specified by clicking is calculated for all of the characteristic points. Then, it is determined whether or not one or more characteristic point positioned distant for a distance shorter that a predetermined threshold value. Alternatively, a process for calculating the distance for a certain characteristic point and comparing the distance with a predetermined threshold value is repeated. When one characteristic point positioned distant for a distance shorter than the threshold value is detected, the process is interrupted. If one or more characteristic points distant for a distance shorter than the threshold value exits, the process proceeds to step S45. If no characteristic point of the foregoing type does not exist, the process proceeds to step S46.

As a result of the foregoing process, display of related information can be performed in accordance with the coordinates of the characteristic point of the object when a portion adjacent to the region of the interest has been specified by an operation using a pointing device or the like.

FOURTH EMBODIMENT

A fourth embodiment will now be described with which an object region having related information which can be displayed is clearly displayed (communicated to a user) by using object region data. In the foregoing case, the object having related information which can be displayed must previously be supplied with object region data including a pointer for pointing the related information.

The block structure of this embodiment is similar to that according to, for example, the third embodiment (see FIG. 29).

As a matter of course, also this embodiment can be realized by software.

A case in which the object region has been expressed as an approximate figure similar to the first embodiment will now be described.

Figure 33:
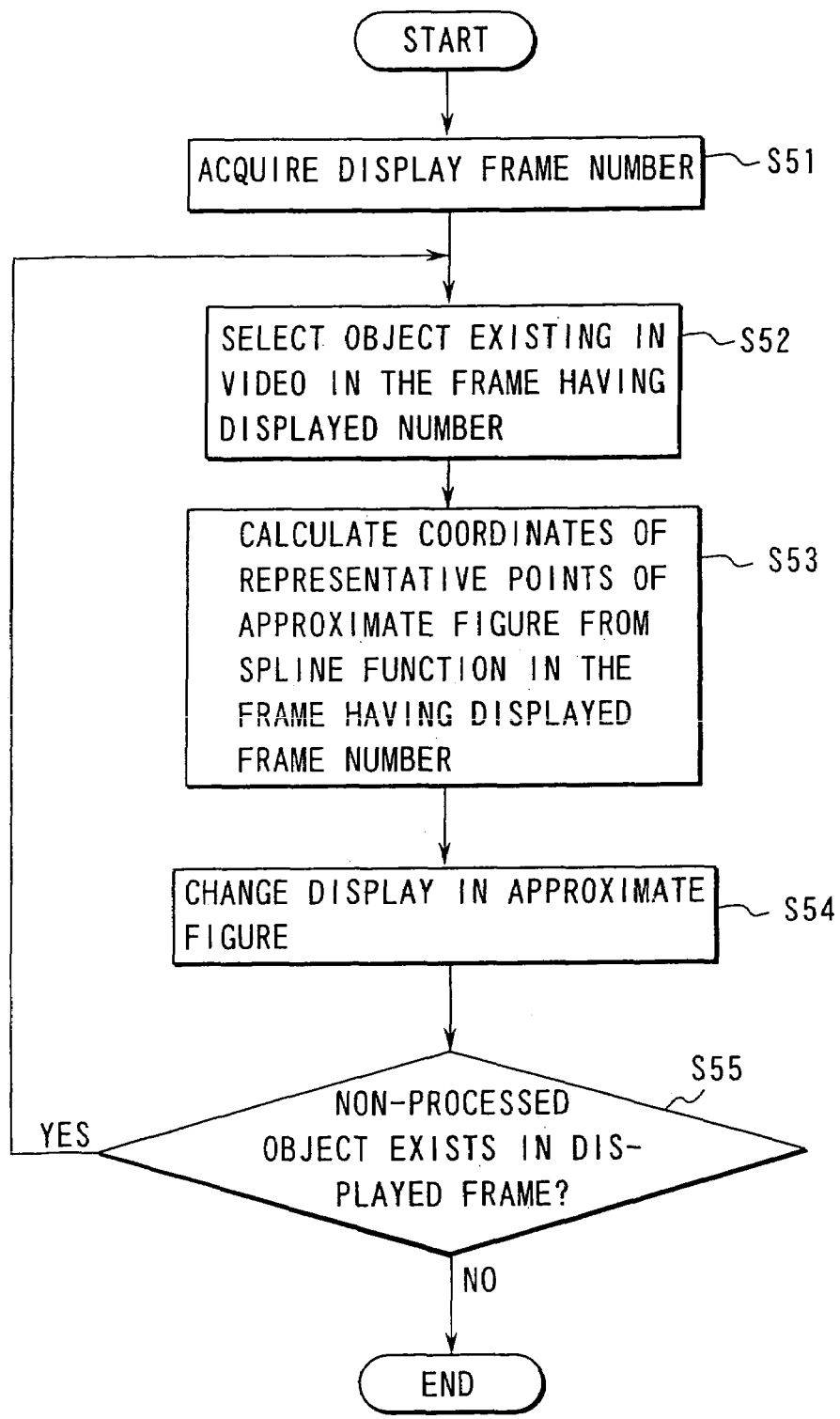
FIG. 33 is a flowchart showing an example of a procedure according to a fourth embodiment of the present invention.

FIG. 33 shows an example of a process according to this embodiment.

An example case in which the approximate figure is an ellipse will now be described. As a matter of course, a similar process is performed in a case of another approximate figure.

In step S51, the frame number of a video which is being displayed is acquired. Note that a time stamp may be employed as a substitute for the frame number (hereinafter the frame number is employed).

In step S52, an object having the frame number acquired in step S51 and existing in the video is selected. The selection is performed by detecting data having a displayed frame number between the leading frame number of object region data given to the video and the trailing frame number.

In step S53, data of a spline function (see FIGS. 6 and 7) is extracted from object region data of the object selected in step S52. Then, the coordinates of representative points of an approximate figure (or a region having related information) in the displayed frame are calculated.

In step S54, a reference to the figure type ID of object region data is made to obtain an approximate figure expressed by the representative points calculated in step S53. Then, display of the image in each approximate figure (for example, an ellipse region) is changed.

The change may be performed by a variety of methods. When the approximate figure is, for example, an ellipse, the brightness of the image in the ellipse region is intensified by a predetermined value. Assuming that the degree of intensification is $\Delta Y$, the brightness before the change of the display is Y and an upper limit of the brightness which can be displayed is Ymax, each pixel in the ellipse is displayed with brightness of $MIN(Y+\Delta Y, Ymax)$. Pixels on the outside of the ellipse are displayed with brightness of Y. Note that MIN(a, b) is a function taking a smaller value of a and b.

Figure 34A:
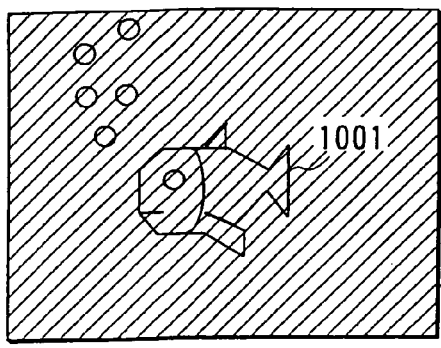
FIGS. 34A and 34B are diagrams showing an example of change in the display of an object region having related information.
Figure 34B:
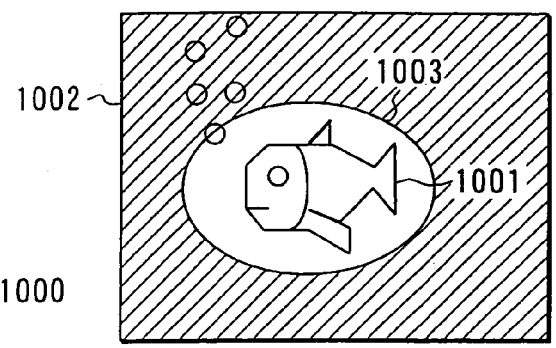

FIGS. 34A and 34B show an example with which the object region is displayed by the method with which the brightness is intensified (in FIGS. 34A and 34B, hatching indicates no change in the brightness and no hatching indicates intensified brightness). FIG. 34A shows a screen 1000 which is in a state in which the display change process in step S54 has not been performed. Reference numeral 1001 represents an object having object region data in the video. A screen 1002 shown in FIG. 34B is displayed after the change in the display in step S54 has been performed. Reference numeral 1003 represents an ellipse region approximating the object region 1001. Display of only the inside portion of the ellipse region 1003 is brightened. Thus, a fact that the object is an object which permits display or the like of related information can be recognized.

When one object is approximated with a plurality of approximate figures (refer to approximate figure number shown in FIGS. 5 and 12), the foregoing process is performed for each approximate figure.

In step S55, it is determined whether or not another object, the display of which must be changed, exists. A determination is made whether or not a non-processed object having a display frame number which is between the leading frame number and the trailing frame number exists. If the non-processed object exists, the process from step S52 is repeated. If no object of the foregoing type exists, the process is completed.

As described above, display of an object region having the related information among the regions of the object in the video which is specified by using object region data is changed. Thus, whether or not the related information exists can quickly be detected.

A method of indicating the object region which permits display or the like of related information may be the above-mentioned method with which the brightness in the object region is changed. Any one of a variety of methods may be employed. A variety of the methods will now be described. The procedure of each process using object region data is basically similar to the flowchart shown in FIG. 33. Therefore, step S54 is changed to a corresponding process.

Figure 35:
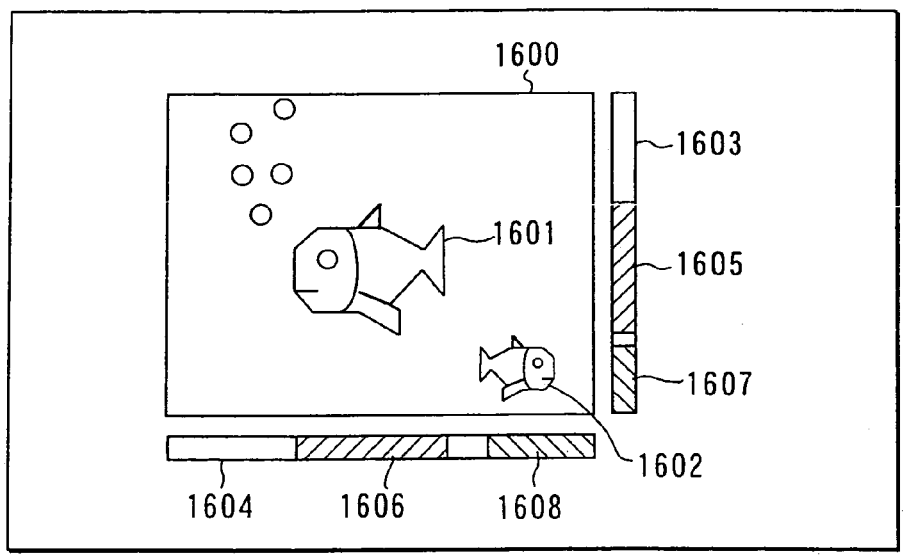
FIG. 35 is a diagram showing another example of the display of the position of an object region having related information.

A display method shown in FIG. 35 is a method of displaying the position of an object having related information on the outside of an image 1600. Reference numerals 1601 and 1602 represent objects having related information. Reference numerals 1603 and 1604 represent bars for displaying the position of the object in the direction of the axis of ordinate and in the direction of the axis of abscissa. Display 1605 and display 1606 correspond to the object 1601 having related information. FIG. 35 shows a structure that bars serving as marks are displayed in the regions in which the region 1601 are projected in the direction of the axis of ordinate and in the direction 6f the axis of abscissa. Similarly, reference numerals 1607 and 1608 represent bars for displaying the object region 1602.

A state of projection of the object region in the foregoing directions can easily be obtained by using the coordinates of the representative points of the approximate figure in the frame obtained from data of the approximate figure of object region data and the figure type ID as described in the embodiments.

It is preferable that the region of a different object is indicated with a bar displayed in a different manner (for example, a different color).

The method according to this embodiment causes a user to specify the inside portion of the image in accordance with the bars 1603 and 1604 displayed in the vertical and horizontal directions on the outside of the image 1600 by using a pointing device. Thus, related information can be displayed.

It is preferable that the region of a different object is indicated with a bar displayed in a different manner (for example, a different color).

Figure 36:
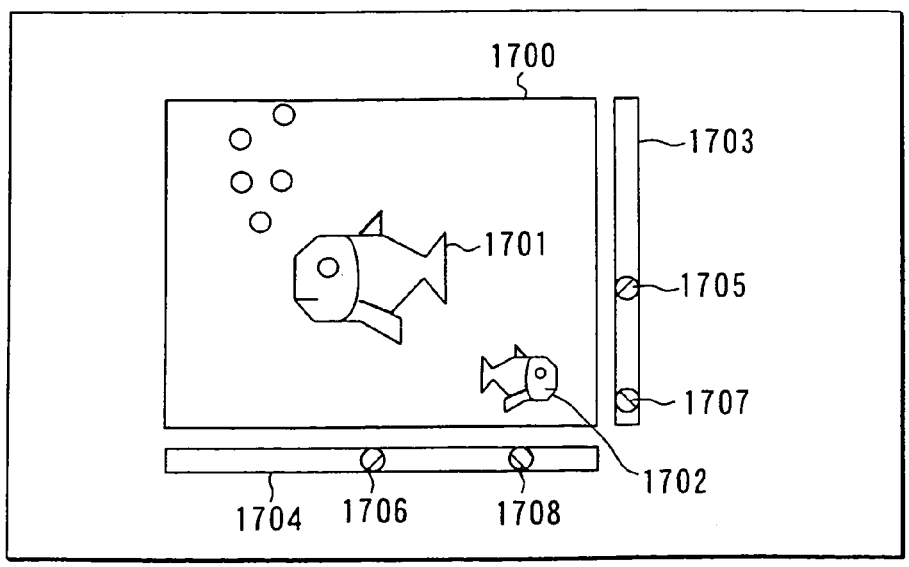
FIG. 36 is a diagram showing another example of the display of the position of an object region having related information.

FIG. 36 shows another display method with which the position of an object having related information is displayed on the outside of an image 1700. Objects 1701 and 1702 each having related information exist in the image 1700. The position of the object having related information is indicated by an object-position indicating bars 1703 and 1704. As distinct from the example shown in FIG. 35, each display bar indicates only the position of the centroid of the object as a substitute for the object region. Circles 1705 and 1706 indicate the centroid of the object 1701. Circles 1707 and 1708 indicate the centroid of the object 1702.

Also the centroid of the object region in the foregoing directions can easily be obtained in accordance with the coordinates of the representative point of the approximate figure in the frame obtained from data of the approximate figure of object region data and the figure type ID.

The foregoing method enables display which can easily be recognized because the size of display on the object position indicating bar can be reduced if the object has a large size or many objects exit.

Figure 37:
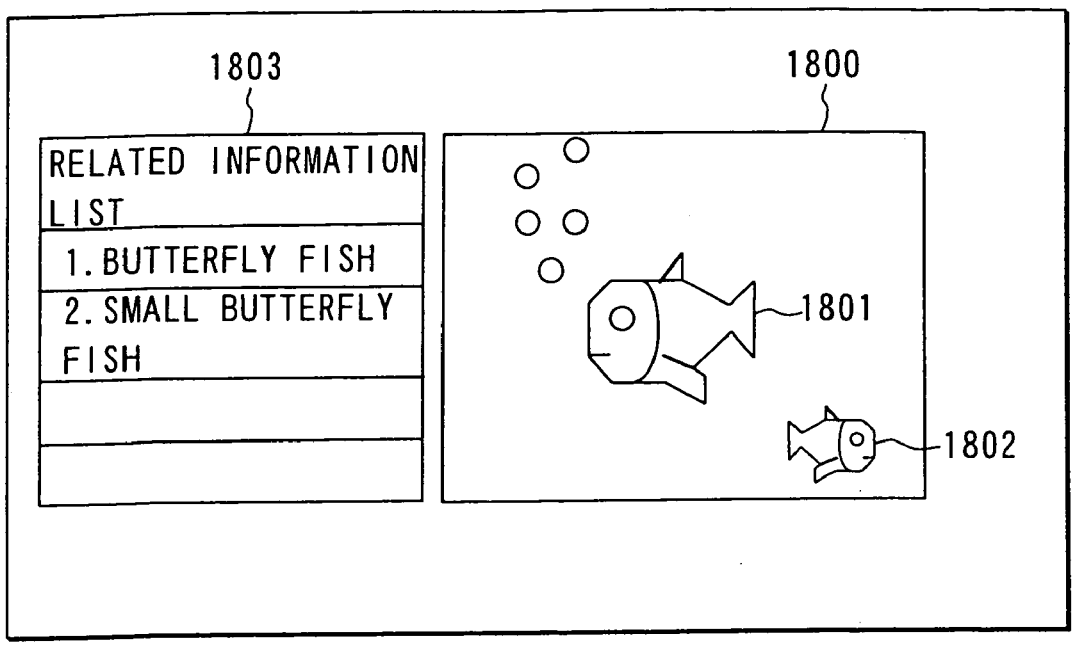
FIG. 37 is a diagram showing an example of display of a description list of an object region having related information.

FIG. 37 shows an example of a display method with which a related information list is displayed on the outside of an image 1800. The image 1800 contains objects 1801 and 1802 each having related information. Reference numeral 1803 represents a list of objects each having related information. The list 1803 shows information of objects each having related information in the image frame which is being displayed. In the example shown in FIG. 37, names of objects are displayed which are obtained as a result of retrieving related information from object region data of the objects existing in the frame.

The foregoing method permits a user to cause related information to be displayed by specifying the name shown in the related information list 1803 as well as the specifying the region 1801 or 1802 with the pointing device. Since also instruction of the number shown in the list 1803 enables related information to be displayed, the foregoing structure can be employed in a case of a remote control having no pointing device.

Figure 38:
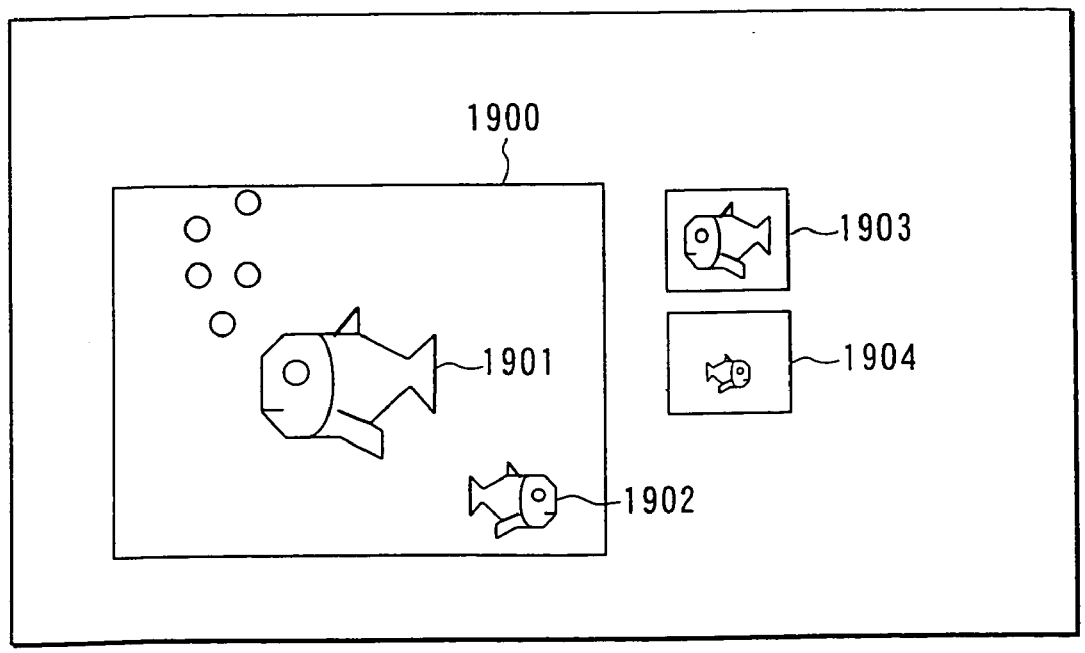
FIG. 38 is a diagram showing an example of display of an object region having related information with an icon.

FIG. 38 shows a display method with which objects 1901 and 1902 existing in an image 1900 and each having related information are indicated with icons 1903 and 1904 to indicate existence of related information. The icon 1903 corresponds to the object 1901, while the icon 1904 corresponds to the object 1902.

Each icon can be displayed by obtaining an approximate figure as described above, by cutting a rectangle region having a predetermined size including the obtained approximate figure from video data in the frame and by, for example, arbitrarily contracting the cut rectangle region.

The foregoing method enables related information to be displayed by directly specifying the icon as well as specifying the object region in the video.

Figure 39:
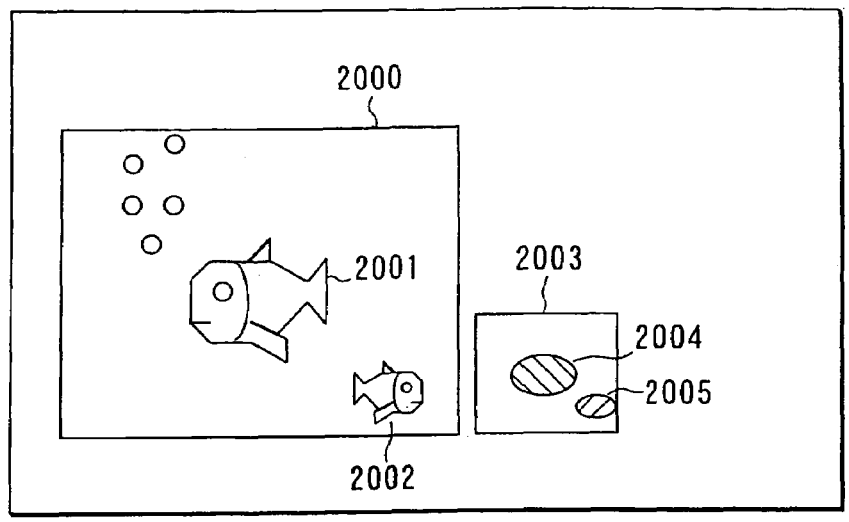
FIG. 39 is a diagram of an example of display of, an object region having related information with a map.

FIG. 39 shows an example of a display method configured to display a map indicating the object region having related information so as to indicate existence of related information. An image 2000 includes objects 2001 and 2002 each having related information. Reference numeral 2003 represents a map of the regions of the objects each having related information. The map 2003 indicates the positions of the regions of the objects each having related information in the image 2000. Reference numeral 2004 represents the object 2001, while reference numeral 2005 represents the object 2002.

The map 2003 has a form obtained by reducing the image 2000 and arranged to display only the images of the object regions (only the approximate figures obtained as described above are displayed at the corresponding positions in the contracted image).

The foregoing method enables related information to be displayed by specifying the object region 2004 or 2005 displayed on the map 2003 as well as direct specification of an object in the image 2000.

Figure 40A:
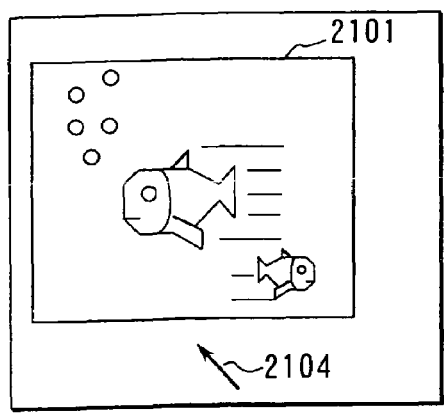
FIGS. 40A and 40B are diagrams showing an example of control of an image reproducing rate for facilitating instruction of an object region.
Figure 40B:
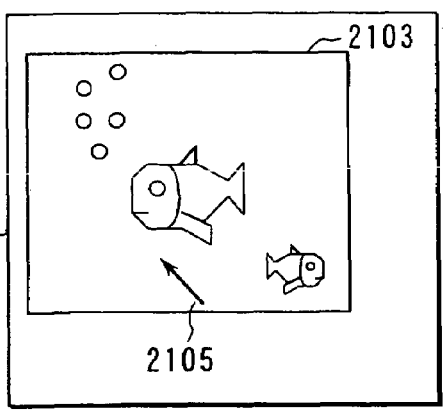

FIGS. 40A and 40B show an example of the display method with which specification of an object existing in the image and having related information is facilitated by using a pointing device by controlling reproduction rate of the image at the position of the mouse cursor. Reference numerals 2100 and 2102 represent the overall bodies of the display screens and reference numerals 2101 and 2103 represent regions on the display screens on which images are being displayed. In the display screen 2100 shown in FIG. 40A, a mouse cursor 2104 is positioned on the outside of the image 2101 so that the image is reproduced at a normal display rate (frame/second)(or reproducing speed). In the display screen 2102 shown in FIG. 40B, the mouse cursor 2105 exists in the image region 2103. Therefore, display rate of the image is lowered or displayed image is frozen.

Another structure may be employed as a substitute for the above-mentioned structure in which image display rate is always lowered or the displayed image is frozen when the mouse cursor has entered the image region. That is, whether or not an object having related information exists in the frame is determined (determination is made by comparing the frame number and the leading frame number/trailing frame number with each other). If the object having related information exists in the frame, the image display rate is lowered or the displayed image is frozen.

For example, an object which is moving at high speed in the video cannot sometimes easily be specified by using the mouse cursor. The foregoing method is arranged to change the reproducing speed according to the position of the mouse cursor. Thus, movement of the object can be slowed when the object is specified or the displayed image can be frozen. Hence it follows that instruction can easily be performed.

Figure 41:
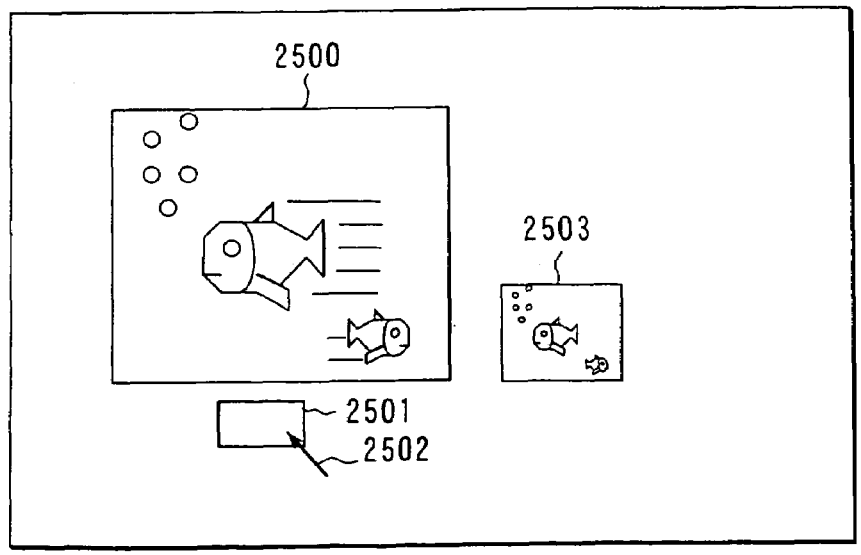
FIG. 41 is a diagram showing an example which enables image capture for facilitating instruction of an object region.

FIG. 41 shows an example of the display method with which an object existing in the image and having related information can easily be specified by using the pointing device. Reference numeral 2500 represents an image which is being reproduced. Reference numeral 2501 represents a button for acquiring an image. When the button 2501 is depressed with a mouse pointer 2502, an image which has been displayed at the specified time can be acquired so as to be displayed on an acquired-image display portion 2503. The image 2500 is continuously reproduced even after the foregoing instruction has been performed with the button 2501. Since the acquired image is displayed on the acquired-image display portion 2503 for a while, instruction of an object which is being displayed in the acquired-image display portion 2503 enables related information of the specified object to be displayed.

The button 2501 for acquiring an image may be omitted. A structure may be employed from which the button 2501 is omitted and with which an image can automatically be acquired when the mouse cursor 2502 enters the video display portion 2500.

A structure may be employed with which whether or not an object having related information exists in the frame is determined when the button 2501 has been depressed or the mouse cursor has entered the image region (for example, a determination is made by comparing the frame number and the leading frame number/trailing frame number with each other). Only when the object having related information exists in the frame, the image is acquired so as to be displayed.

The foregoing method enables related information to easily be specified from a still image which is being displayed on the acquired-image display portion 2503.

The foregoing variations may be employed. Another method may be employed with which the region of an image which permits display or the like of related information is clearly displayed. Also a method may be employed with which instruction is facilitated. Thus, a variety of methods for aiding the operation of the user may be employed.

A case in which the object region is expressed as characteristic points of the object similarly to the second embodiment will now be described.

Portions different from those according to the first embodiment will mainly be described.

A flowchart is, in the foregoing case, a flowchart which is basically similar to that shown in FIG. 33 except for characteristic points being employed as a substitute for the representative points. Specifically, the coordinates of characteristic points of the approximate figure are calculated in step S53.

FIG. 34 shows the structure that the brightness in the approximate FIG. 1003 corresponding to the object 1001 is intensified. If three or more characteristic points exist in the foregoing case, a polygon having the vertices which are the characteristic points may be formed. Moreover, the brightness of the inside portion of the polygon may be intensified. If two or more characteristic points exist, a figure of some kind may be formed which has the representative points which are the characteristic points. Moreover, the brightness in the figure may be intensified. Alternatively, a figure, such as a circle, the center of which is each of the characteristic points and which has a somewhat large size is formed. Moreover, each of the formed figure, which must be displayed, is made conspicuous by means of brightness, color or blinking.

The structure shown in FIG. 35 is arranged such that projection of the approximate figures corresponding to the objects 1601 and 1602 in the vertical and horizontal directions is displayed as the bar set 1605 and 1607 or the bar set 1606 and 1608. If three or more characteristic points exist in the foregoing case, a polygon having the vertices which are the characteristic points may be formed. Moreover, projection of the polygon in the directions of the two axes may be displayed as the bars. If two or more characteristic points exist, a rectangle having the vertices which are the characteristic points may be formed. Moreover, projection into the directions of the two axes may be displayed as the bars. If one characteristic point exists, the foregoing method shown in FIG. 36 may be employed with which the position of the centroid is displayed with circles in the bars.

FIG. 38 shows the structure with which the image of an object is extracted by cutting in accordance with the approximate figure or the like so as to be displayed as an icon. Also in the foregoing case, the image of an object can be extracted by cutting in accordance with the characteristic points so as to be displayed as an icon.

FIG. 39 shows a structure that the approximate FIGS. 1903 and 1904 are displayed in a map. Also in the foregoing case, a figure of some kind formed in accordance with characteristic points as described above may be displayed as a map.

The methods shown in FIGS. 37, 40 and 41 may employed in the foregoing case.

The foregoing variations may be employed. Another method may be employed with which the region of an image which permits display or the like of related information is clearly performed. Also a method may be employed with which instruction is facilitated. Thus, a variety of methods for aiding the operation of the user may be employed.

FIFTH EMBODIMENT

A fifth embodiment will now be described with which an object in a video is retrieved.

The block structure according to this embodiment is similar to that according to the third embodiment (see FIG. 29). Note that a structure shown in FIG. 29 may be arranged such that the related information display portion is omitted (for example, a system may be employed with which retrieval of an object is performed without use of related information). Another structure from which the instruction input portion is omitted may be employed (for example, a structure may be employed with which the GUI is not used to instruct the retrieval). As a matter of course, also this embodiment can be realized by software.

The third embodiment has the structure that the two focal points and one point on the ellipse are employed as the representative points when the ellipse is employed. A structure will now be described in which three vertices of circumscribing rectangle of an ellipse are employed as the representative points of an ellipse. As a matter of course, the retrieval is permitted regardless of employment of the representative points.

Note that the following symbols $V_1$ to $V_4$, P, Q, $F_1$, $F_2$, $C_0$, T, U and C are vector quantities.

Since the present invention is configured to describe the trajectory of the object region, estimation of points through which the object has passed and points through which the object has not passed enables the object to be estimated. For example, retrieval such as "retrieve vehicles which have passed through the center of this crossing and entered that traffic lane" or "retrieve vehicles which have entered the road from this position and which have not moved to this traffic lane" can be performed.

Figure 42:
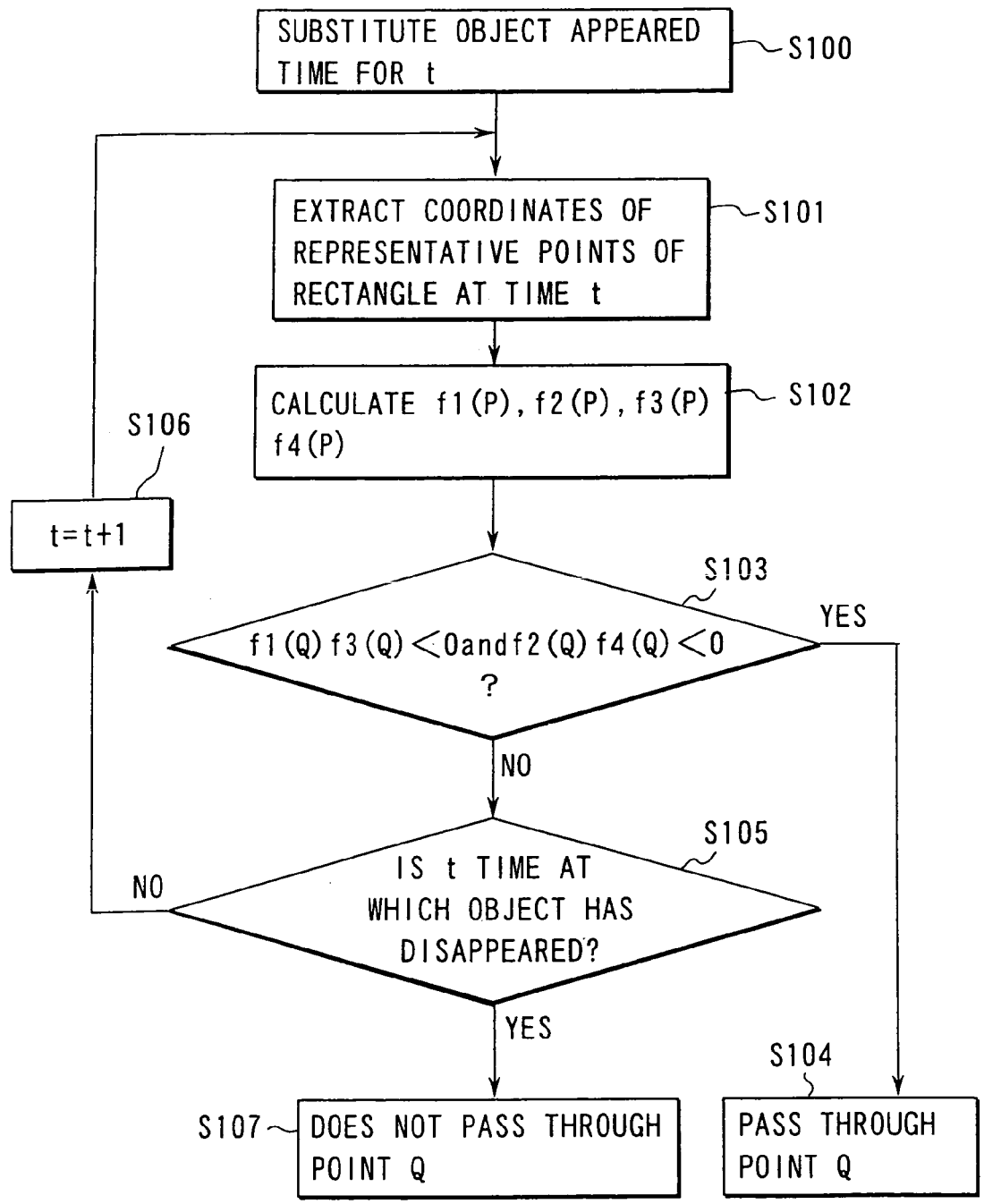
FIG. 42 is a flowchart showing an example of a procedure according to a fifth embodiment of the present invention.
Figure 43:
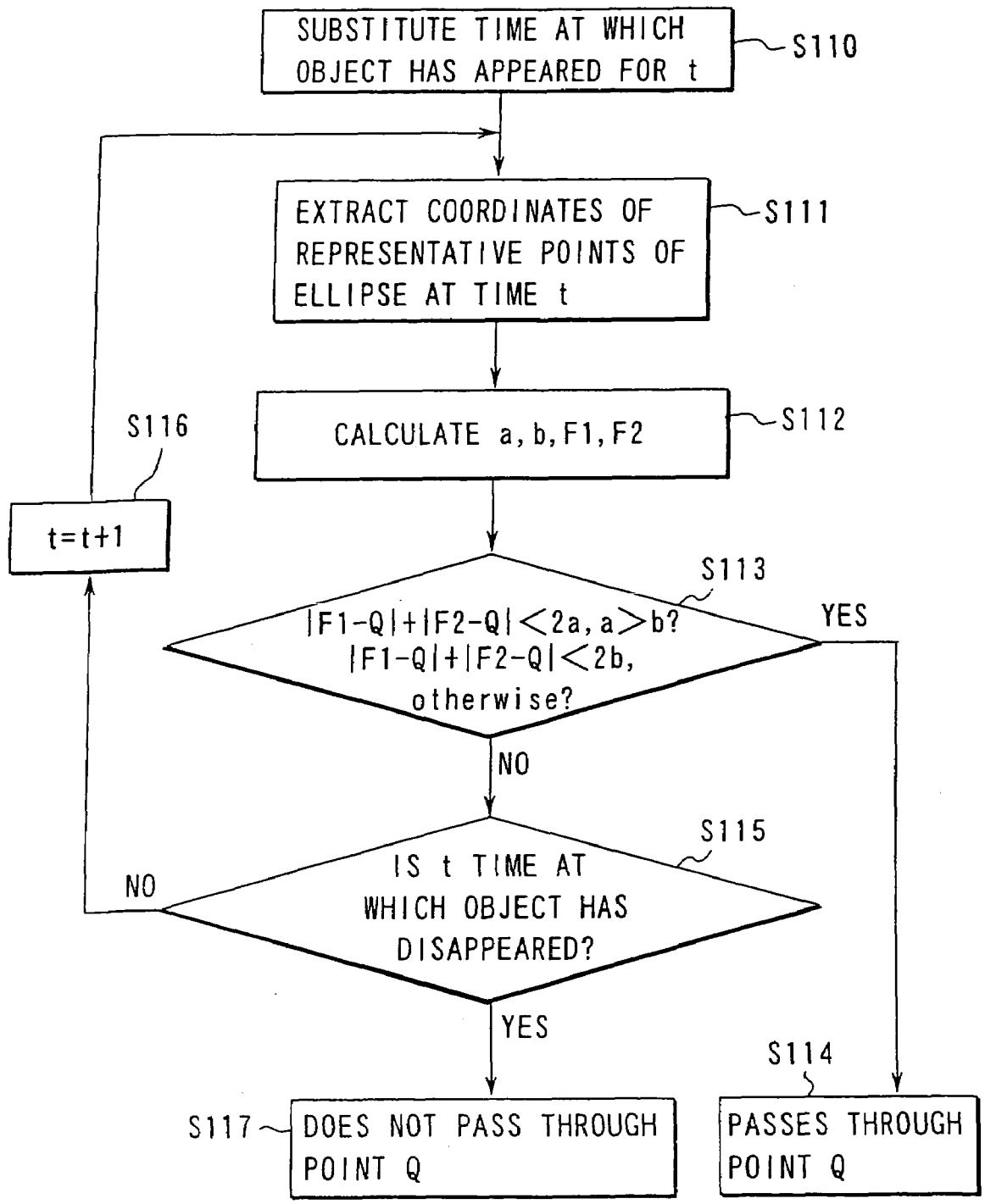
FIG. 43 is a flowchart showing another example of the procedure according to the fifth embodiment.

FIGS. 42 and 43 show an example of the procedure for performing the foregoing retrieval.

FIG. 42 shows an example of the procedure which is employed when a rectangle is employed to express an object.

An assumption is made that point Q has been specified as the point through which the object has passed and has not passed.

In step S100, time at which an object has appeared at time t is set. In step S101, the coordinates of representative points $V_1$, $V_2$ and $V_3$ at certain time t are extracted. The coordinates are calculated as the values of spline functions at the corresponding time. The coordinates of the residual vertices can easily be obtained in accordance with the three vertices of the rectangle, as follows:

$$V_4 = V_1 - V_2 + V_3$$

In step S102, the values of four functions expressed by the following equations are obtained.

$$f_1(P) = (V_{2y} - V_{1y}) \times (x - V_{1x}) - (V_{2x} - V_{1x}) \times (y - V_{1y})$$

$$f_2(P) = (V_{2y} - V_{3y}) \times (x - V_{2x}) - (V_{2x} - V_{3x}) \times (y - V_{2y})$$

$$f_3(P) = (V_{3y} - V_{4y}) \times (x - V_{3x}) - (V_{3x} - V_{4x}) \times (y - V_{3y})$$

$$f_4(P) = (V_{1y} - V_{4y}) \times (x - V_{4x}) - (V_{1x} - V_{4x}) \times (y - V_{4y})$$

where $V_i = (V_{ix}, V_{iy})$

In step S103, it is determined whether or not the four obtained p=(x, y) functions satisfy the following relationship:

$$f_1(Q) \times f_3(Q) \leq 0 \text{ and } f_2(Q) \times f_4(Q) \leq 0$$

If the foregoing relationship is held, the object passes the specified point Q at time t. Therefore, it is determined that the object passes through the point Q (step S104). If the relationship is not held, the object does not passes through the point Q at time t Then, whether or not the object has passed through the point Q at another time is detected.

In step S105, it is determined whether or not detection of all of moments of time t has been performed by determining whether or not time t is the same as time at which the object has disappeared from the screen. If the two moments of time are the same, the process is completed and it is determined that the object has not passed through the point Q (step S107). If time t is earlier than time at which the object has disappeared, t is incremented by one in step S106. Then, the process from step S101 is repeated.

The foregoing process is performed for all of the objects which is to be retrieved so that objects which satisfy the retrieval condition can be retrieved.

FIG. 43 shows an example of the procedure which is employed when an ellipse is employed to express an object.

In step S110, time at which the object has appeared at time t is set.

In step S111 the coordinates of representative points $V_1$, $V_2$ and $V_3$ of the ellipse at certain time t are extracted. The representative points are the three vertices of the circumscribing rectangle of the ellipse which are successively and clockwise arranged in an order as $V_1$, $V_2$ and $V_3$. The calculation is performed by a process similar to that employed to process the rectangle.

In step S112, a, b and points $F_1$ and $F_2$ expressed by the following equations are obtained ($F_1$ and $F_2$ are obtained as follows according to the relationship in the magnitude between a and b):

$$a = |V_2 - V_1|/2$$

$$b = |V_2 - V_3|/2$$

$$F_1 = C_0 + e(V_2 - V_1)/2 \text{ (when } a > b\text{) } C_0 + e(V_2 - V_3)/2 \text{ (when } a \leq b\text{)}$$

$$F_2 = C_0 - e(V_2 - V_1)/2 \text{ (when } a > b\text{) } C_0 - e(V_2 - V_3)/2 \text{ (when } a \leq b\text{)}$$

where $C_0$ and e are as follows (e is determined in accordance with the relationship in the magnitude between a and b)

$$C_0 = (V_1 + V_3)/2$$

$$e = \{\sqrt{(a^2 - b^2)}\}/a \text{ (when } a > b\text{) } \{\sqrt{(b^2 - a^2)}\}/b \text{ (when } a \leq b\text{)}$$

In step S113, it is determined whether or not the following conditions are satisfied (the conditions vary according to the relationship in the magnitude between a and b).

condition when a>b:

$$|F_1 - Q| + |F_2 - Q| \leq 2a$$

condition when a≤b:

$$|F_1 - Q| + |F_2 - Q| \leq 2b$$

When the conditions are satisfied, the point Q exists in the ellipse at time t. Therefore, it is determined that the object has passed through the point Q and the process is completed (step S114). If the conditions are not satisfied, the point Q exists on the outside of the ellipse at time t. Therefore, a similar process is performed for other moments of time t.

In step S115, it is determined as the completion condition whether or not time t is time at which the object has disappeared. If time t is time at which the object has disappeared, it is determined that the object has not passed through the point Q. Thus, the process is completed (step S117). If time t is not time at which the object has disappeared, t is incremented in step S116 and the process from step S111 is repeated.

The foregoing process is performed for all of the objects which is to be retrieved so that the objects which satisfy the retrieval conditions are retrieved.

The foregoing process is arranged such that a fact whether or not the specified point is included in the approximate figure is employed as the criterion for making determination. A variety of criteria may be employed. For example, it may be determined that the object has passed the point when the specified point exists adjacent to the approximate figure. Alternatively, it may be determined when the specified points are successively included in the approximate figure over a predetermined number of frames.

Also in a case where another figure is employed to express the shape of the object, a process corresponding to the figure is performed. Thus, objects which satisfy the retrieval conditions can be retrieved.

When a plurality of points of passage or a plurality of point of non-passage have been specified, the foregoing process is performed for all of the specified points.

As a matter of course, one or more points of passage and one or more points of non-passage may be combined with each other.

The retrieval can be performed by using the combinational logic for a plurality of points of passage and points of non-passage. For example, retrieval can be performed, for example, "retrieve objects which have passed through either of point a or b and which have not passed through both of points c and d".

The retrieval of the point of passage can be widened to a structure that time for which the object exists at the point of passage. The foregoing retrieval includes "retrieve persons which have done free browsing for 10 minutes or longer" and "retrieve persons who were in front of the cash dispenser for three minutes or longer". To perform the foregoing retrieval, time for which the object exists at the input position is measured. Then, only the objects which exist at the input position for time longer than time specified by the user are shown.

Another example of the widened retrieval will now be described in which a condition in terms of the size (the area of the object) is added.

When the shape of the object is expressed by a rectangle or an ellipse, the area of the object at certain time t can be calculated as follows:

in the case of the rectangle, $$S_R = |V_2 - V_1| \times |V_3 - V_2|$$

in the case of the ellipse, $$S_E = ab\pi$$

When the obtained value is used, retrieval can be performed by using a condition that, for example, the area is not smaller than $S_S$ nor larger than $S_L$. For example, when "retrieve persons which walk on the road. Note that dogs and cats are not retrieved" is required, previous instruction of an area larger than that of the dogs and cats enables the retrieving accuracy to be improved.

Another example of the retrieval will now be described with which objects which have moved through similar trajectories are retrieved.

An assumption is made that the trajectories of a first object and a second object are T and U, respectively. Another assumption is made that time for which the first object exists and time for which the second object exists are $N_T$ and $N_U$, respectively. An assumption is made that $N_T \geq N_U$ in the foregoing case. Another assumption is made that time at which each of the objects has appeared is t=0. The foregoing conditions can always be satisfied by changing T and U and by shifting the origin of the time axis.

In the foregoing case, distance d(T, U) between T and U is defined as follows:

$$D(T, U) = \min_{0 \leq i \leq N_T - N_U} \sum_{i,j=0}^{N_U} E^2(T(j), U(j+i))$$

The coordinates of T at time t is expressed as T (t) and E(P, Q) shows Euclidean distance.

By using the distance between the trajectories, the distance-between the trajectory of the object specified by the user and the trajectory of another object is calculated for all of the other objects. Thus, the object exhibiting the shortest distance is displayed or the objects exhibiting the short distances are displayed by the number specified by the user. Thus, the objects which draw similar trajectories can be retrieved.

Moreover, an object which draws a trajectory similar to a trajectory drawn by a user by an input device such as a mouse can be retrieved. In the foregoing case, the trajectory drawn by the user does not contain time information. Therefore, the direction between the trajectories must be calculated by a method distinct from d(T, U). Therefore, the distance d'(T, U) between the trajectory T and the trajectory U drawn by the user is calculated as follows:

$$d'(T, U) = \sum_{i}^{N_{PU}-1} \min_{0 \leq j \leq N_T} E^2(T(j), U_i)$$

The trajectory drawn by the user is expressed by dot sequence $U_i$ ($0 \leq i < N_{PU}$). Note that $N_{PU}$ is the number of the dot sequences. One or more objects exhibiting the short distance are displayed at objects each drawing the similar trajectory. Thus, retrieval can be performed.

When the trajectory of the center of the object has been described, objects exhibiting short distance d(T, U) is retrieved such that the trajectories are T and U. When only information of a rectangle approximating the shape of the object or the trajectory of an ellipse can be obtained, the trajectory of the center is estimated. Then, the distance between the trajectories of the objects is calculated. An estimated value of center C at certain time t is obtained from the coordinates $V_1$, $V_2$ and $V_3$ of the vertices of the rectangle or the ellipse as follows:

$$C \approx (V_1 + V_3)/2$$

As a result of the estimation, similar trajectories can be retrieved from the trajectories of all of the objects.

Although the example has been described in which the representative points of the approximate figure of the object region are employed, the present invention may be applied to a case where the characteristic points of the object region are employed similarly to the second embodiment. In the foregoing case, whether or not the object has passed through the specified point is determined in accordance with a fact whether or not the distance between the characteristic point and the specified point is shorter than a reference value.

The foregoing embodiments and structures may arbitrarily be combined with one another.

Each of the foregoing structures may be realized by a recording medium storing a program for causing a computer to execute a predetermined means (or causing the computer to act as a predetermined means or causing the computer to realize a predetermined function).

Additional advantages and modifications will readily occur to those skilled in the art. Therefore, the present invention in its broader aspects is not limited to the specific details, representative devices, and illustrated examples shown and described herein. Accordingly, various modifications may be made without departing from the spirit or scope of the general inventive concept as defined by the appended claims and their equivalents.

The present invention is configured such that the object region in a video is described as the parameter of a function approximating the trajectory obtained by arranging positional data of representative points of the approximate figure of the object region or the characteristic points of the object region in a direction in which frames proceed. Therefore, the region of a predetermined object can be described with a small quantity of data. Moreover, creation and handling of data can easily be performed.

According to the present invention, a user is able to easily instruct an object in a video and determine the object.

According to the present invention, retrieval of an object in a video can easily be performed.

What is claimed is:

1. A computer readable medium storing a computer program code, comprising:
   a first computer program code configured to generate a signal for use in a video decoding apparatus and for describing information of a moving object region in a video sequence, the signal comprising:
   time data including a start time and a duration time of the object region in the video sequence;
   type data being an integer, the integer specifying a type of figure, corresponding to the object region, to be an ellipse, the integer also specifying a number of representative points of the figure; and
   figure data specifying a trajectory of at least one of the representative points, including:
   time arrangement data including times of points used to determine the trajectory,
   key value data representing values of the points used to determine the trajectory, and
   function data for indicating the trajectory of at least one of the representative points and therefore also the trajectory of the object region, using function identifier, the function identifier indicating an order of a function used to determine the trajectory or indicating that no function is defined to determine the trajectory.

2. A computer readable medium of claim 1, wherein:
   the function data is used to indicate the trajectory using a formula:

$$f(t) = f_a + v_a(t - t_a),$$

where $v_a = (f_b - f_a)/(t_b - t_a)$ when an order of a function used to indicate the trajectory is first order, where $t_a$ represents a time of a first point of the points used to determine the trajectory, $t_b$ represents a time of a second point of the points used to determine the trajectory, $f_a$ is a coordinate of the first point, $f_b$ is a coordinate of the second point, and t is a time of a point to be determined.

3. A computer readable medium of claim 1, wherein the function data further comprises:
   parameter data specifying a second order coefficient for the trajectory when an order of a function indicating the trajectory is second order.

4. A computer readable medium of claim 3, wherein the function data is used to indicate the trajectory using a formula:

$$f(t)=f_a+v_a(t-t_a)+\tfrac{1}{2}a_a(t-t_a)^2,$$

where $v_a=(f_b-f_a)/(t_b-t_a)-\tfrac{1}{2}a_a(t_b-t_a)$ when an order of a function used to indicate the trajectory is second order, where $t_a$ represents a time of a first point, $t_b$ represents a time of a second point, $f_a$ is a coordinate of the first point, $f_b$ is a coordinate of the second point, and t is a time of a point to be determined.

5. A computer readable medium of claim 1, further comprising hypermedia information.

6. A computer readable medium of claim 1, wherein: the representative points of the figure are ordered clockwise.

7. A computer readable medium of claim 6, wherein: the representative points of the figure are continuously ordered.

8. A computer readable medium of claim 7, wherein: the integer represents all of the representative points of the figure without omitting any representative points.

9. A computer readable medium of claim 1, wherein: the time arrangement data are sorted in increasing order.

10. A computer readable medium of claim 1, wherein: the figure data specifies the trajectory of at least three successive frames.

11. A computer readable medium of claim 1, wherein the function identifier is described by a code.

* * * * *